(12) United States Patent
Sakai

(10) Patent No.: US 10,768,634 B2
(45) Date of Patent: *Sep. 8, 2020

(54) CONTROL SYSTEM FOR WORK MACHINE, WORK MACHINE, MANAGEMENT SYSTEM FOR WORK MACHINE, AND MANAGEMENT METHOD FOR WORK MACHINE

(71) Applicant: Komatsu Ltd., Tokyo (JP)

(72) Inventor: Atsushi Sakai, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 252 days.

This patent is subject to a terminal disclaimer.

(21) Appl. No.: 15/762,680

(22) PCT Filed: Dec. 25, 2015

(86) PCT No.: PCT/JP2015/086340
§ 371 (c)(1),
(2) Date: Mar. 23, 2018

(87) PCT Pub. No.: WO2017/109977
PCT Pub. Date: Jun. 29, 2017

(65) Prior Publication Data
US 2018/0292840 A1    Oct. 11, 2018

(51) Int. Cl.
*G05D 1/02* (2020.01)
*G08G 1/00* (2006.01)
*G01C 21/20* (2006.01)

(52) U.S. Cl.
CPC .......... *G05D 1/0274* (2013.01); *G01C 21/20* (2013.01); *G05D 1/024* (2013.01); *G05D 1/027* (2013.01); *G05D 1/0257* (2013.01); *G05D 1/0278* (2013.01); *G05D 1/0282* (2013.01); *G08G 1/207* (2013.01); *G05D 2201/0202* (2013.01)

(58) Field of Classification Search
CPC .... G05D 1/0274; G05D 1/024; G05D 1/0257; G05D 1/027; G05D 1/0278;
(Continued)

(56) References Cited

U.S. PATENT DOCUMENTS 5,555,503 A * 9/1996 Kyrtsos ................... G01S 19/11
701/518
5,956,250 A * 9/1999 Gudat ..................... G05D 1/027
701/26

(Continued)

FOREIGN PATENT DOCUMENTS

JP    2002-215236 A    7/2002
JP    2003-114613 A    4/2003
(Continued)

OTHER PUBLICATIONS

International Search Report dated Mar. 15, 2016, issued for PCT/JP2015/086340.

*Primary Examiner* — Justin M Jonaitis
(74) *Attorney, Agent, or Firm* — Locke Lord LLP

(57) ABSTRACT

A control system includes: a position detector detecting a position of a work machine; a non-contact sensor detecting, in non-contact manner, an object beside a travel route; a map data generator generating management map data based on detection data obtained by the position detector and detection data obtained by the non-contact sensor; a first storage storing divided map data pieces; a second storage different from the first storage; an update unit determining specific map data from among the plurality of divided map data pieces stored in the first storage based on detection data of the position detector, and cause the second storage to read the specific map data; and a position calculator calculating a position of a work machine by matching the specific map data read into the second storage with the detection data obtained by the non-contact sensor.

12 Claims, 18 Drawing Sheets

(58) Field of Classification Search
CPC ......... G05D 1/0282; G05D 2201/0202; G01C 21/20; G01C 21/26–28; G08G 1/207; G08G 1/00; G08G 1/04; G08G 1/056; G01S 17/66–89; G01S 17/936; G01S 13/86–867; G01S 13/89–90; G01S 13/931; G01S 19/25; G01S 19/45–50; G01S 19/13–14
USPC ........................................................ 701/25
See application file for complete search history.

(56) References Cited

U.S. PATENT DOCUMENTS

| | | |
|---|---|---|
| 6,751,535 B2 | 6/2004 | Mori |
| 7,756,615 B2 * | 7/2010 | Barfoot ................ G05D 1/0297 180/168 |
| 9,008,889 B2 | 4/2015 | Osagawa et al. |
| 9,740,209 B2 | 8/2017 | Nakano et al. |
| 9,869,555 B2 * | 1/2018 | Sakai ...................... G01S 13/86 |
| 10,019,007 B2 * | 7/2018 | Sakai ................... G05D 1/0088 |
| 10,026,308 B2 * | 7/2018 | Sakai ...................... G01S 13/89 |
| 10,031,528 B2 * | 7/2018 | Sakai ................... G05D 1/0274 |
| 10,119,830 B2 * | 11/2018 | Sakai ...................... G01C 21/00 |

FOREIGN PATENT DOCUMENTS

| | | |
|---|---|---|
| JP | 2008-021023 A | 1/2008 |
| JP | 2011-215474 A | 10/2011 |
| JP | 2012-118694 A | 6/2012 |
| JP | 2014-219721 A | 11/2014 |

* cited by examiner

FIG.4
FIG.5
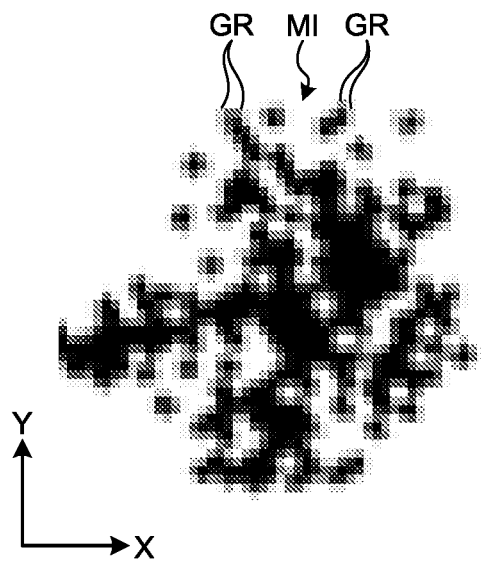

CONTROL SYSTEM FOR WORK MACHINE, WORK MACHINE, MANAGEMENT SYSTEM FOR WORK MACHINE, AND MANAGEMENT METHOD FOR WORK MACHINE

FIELD

The present invention relates to a control system for a work machine, a work machine, a management system for a work machine, and a management method for a work machine.

BACKGROUND

In a case where a vehicle travels on a general road, the vehicle may travel while acquiring road information and referring to the road information (refer to Patent Literature 1).

CITATION LIST

Patent Literature

Patent Literature 1: Japanese Laid-open Patent Publication No. 2011-215474 A

SUMMARY

Technical Problem

In a case where a work machine travels in a mining site of a mine, it can be considered that the work machine travels referring to map data of the mine. The mining site in a mine is vast. Therefore, a data volume of the map data of the mine is enormous. In a case where all of pieces of acquired map data of the mine is stored in a storage unit provided in the work machine, a storage unit having a large capacity is required. During travel in the mine, the work machine is just to refer only to map data around the work machine. When all of the pieces of the map data of the mine are stored in the storage unit, a load of calculation processing is increased at the time of attempting to extract only the map data around the work machine.

An aspect of the present invention is directed to providing a control system for a work machine, a work machine, a management system for a work machine, and a management method for a work machine, in which a data amount to be read into a storage unit is prevented from becoming enormous and only necessary map data can be efficiently extracted.

Solution to Problem

According to a first aspect of the present invention, a control system for a work machine, comprises: a position detecting device configured to detect a position of a work machine that travels on a travel route; a non-contact sensor configured to detect, in a non-contact manner, an object beside a travel route on which the work machine travels; a map data generating unit configured to generate management map data indicating a map of a management area in the mine on the basis of detection data obtained by the position detecting device and detection data obtained by the non-contact sensor; a first storage unit configured to store divided map data pieces each indicating a map of a divided area set by dividing the management area; a second storage unit different from the first storage unit; an update unit configured to determine, on the basis of detection data obtained by the position detecting device, specific map data from among the plurality of divided map data pieces stored in the first storage unit, and cause the second storage unit to read the specific map data; and a position calculating unit configured to calculate a position of the work machine by matching the specific map data read into the second storage unit with detection data obtained by the non-contact sensor.

According to a second aspect of the present invention, a work machine comprises the control system for a work machine according to the first aspect of the present invention.

According to a third aspect of the present invention, a management system for a work machine, comprising, in the work machine according to the second aspect of the present invention, a management device configured to output course data to define the travel route.

According to a fourth aspect of the present invention, a management method for a work machine, comprises: generating management map data indicating a map of a management area in the mine on the basis of detection data obtained by a position detecting device that detects a position of a work machine traveling on a travel route and detection data obtained by a non-contact sensor that detects, in a non-contact manner, an object beside the travel route on which the work machine travels; setting a plurality of divided areas by dividing the management area and storing, in a first storage unit, a plurality of divided map data pieces each indicating a map of each of the divided areas; acquiring positional data of the work machine; causing a second storage unit different from the first storage unit to read specific map data determined from among the plurality of divided map data pieces stored in the first storage unit on the basis of the positional data of the work machine; and calculating a position of the work machine by matching the specific map data read into the second storage unit with detection data obtained by the non-contact sensor.

Advantageous Effects of Invention

According to the aspect of the present invention, it is possible to provide the control system for a work machine, the work machine, the management system for a work machine, and the management method for a work machine, in which a data amount to be read into the storage unit is prevented from becoming enormous and only necessary map data can be efficiently extracted.

BRIEF DESCRIPTION OF DRAWINGS

FIG. 4 is a diagram illustrating a part of map data stored in a map storage database of a control system according to the first embodiment.

FIG. 5 is an enlarged view of a portion XIV in FIG. 4.

DESCRIPTION OF EMBODIMENTS

In the following, embodiments of the present invention will be described with reference to the drawings, but the present invention is not limited thereto.

First Embodiment

Overview of Management System for Mining Machine

Figure 1:
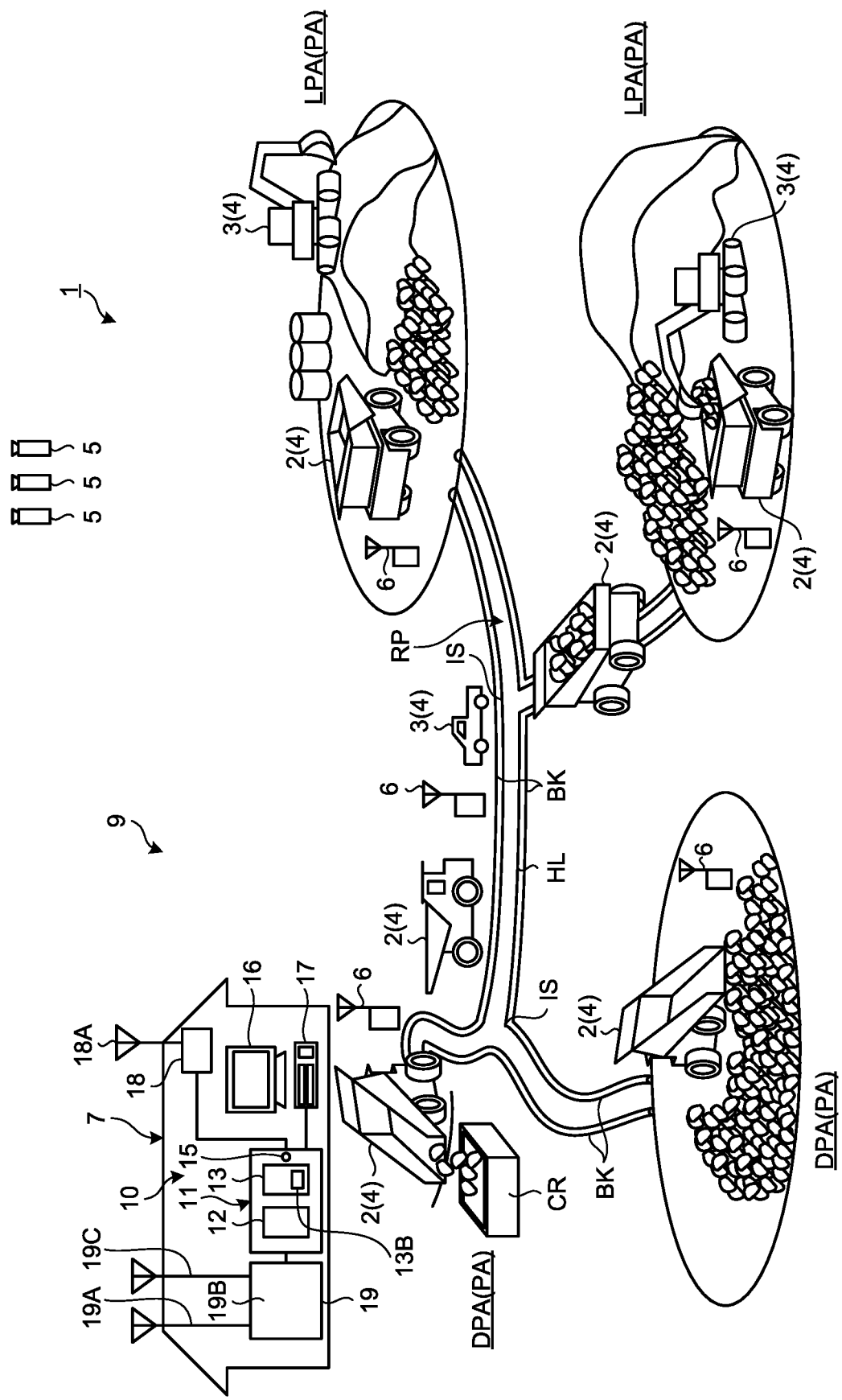
FIG. 1 is a view illustrating an exemplary management system for a work machine according to a first embodiment.

FIG. 1 is a view illustrating an exemplary management system 1 for a work machine 4 according to a first embodiment. In the first embodiment, an example will be described in which the work machine 4 is a mining machine operating in a mine. In the following description, the work machine 4 will be suitably referred to as a mining machine 4. The work machine 4 may not be a work machine operating in a mine.

The management system 1 performs management for the mining machine 4. Management for the mining machine 4 includes at least one of operational management for the mining machine 4, evaluation on productivity of a mining machine 4, evaluation on operation technique of an operator of a mining machine 4, maintenance for a mining machine 4, and abnormality diagnosis for a mining machine 4.

The mining machine 4 is a generic term for machinery used in various kinds of work in a mine. The mining machine 4 includes at least one of a boring machine, an excavating machine, a loading machine, a hauling machine, a crusher, and a vehicle operated by a worker. The excavating machine is a mining machine to excavate a mine. The loading machine is a mining machine that loads matters to be loaded on a hauling machine. The loading machine includes at least one of a hydraulic excavator, an electric excavator, and a wheel loader. The hauling machine includes a moving body such as a dump truck movable in a mine and is a mining machine to haul loaded matters. The loaded matters include at least one of earth, sand, and ore generated from mining work. The crusher crushes earth discharged from the hauling machine.

In the first embodiment, an example will be described in which the dump truck 2 provided as a hauling machine that can travel in a mine is managed by the management system 1. As illustrated in FIG. 1, the dump truck 2 travels in a workplace PA of the mine and at least a part of a hauling path HL leading to the workplace PA. The workplace PA includes at least one of a loading place LPA and a discharging place DPA. The hauling path HL includes an intersection IS. The dump truck 2 travels on a travel route RP set in the mine. An object is provided beside the travel route RP. In the first embodiment, it is assumed that the object provided beside the travel route RP is a bank BK. Note that an object provided beside the travel route RP may also be a wall or a structure artificially manufactured. For example, the object may include a metal or concrete.

The dump truck 2 is a movable body movable in a mine. The travel route RP is set in at least a part of the loading place LPA, discharging place DPA, and hauling path HL.

The loading place LPA is an area where loading work to load matters to be loaded onto the dump truck 2 is performed. The discharging place DPA is an area where discharging work to discharge the loaded matters from the dump truck 2 is performed. In the first embodiment, a crusher CR is provided in at least a part of the discharging place DPA.

In the first embodiment, the dump truck 2 is a so-called unmanned dump truck that autonomously travels on the travel route RP on the basis of a command signal from a management device 10. Autonomous travel of the dump truck 2 indicates traveling on the basis of a command signal from the management device 10 without depending on operation by a worker. Meanwhile, the dump truck 2 may also be made to travel by operation of a worker.

In FIG. 1, the management system 1 includes the management device 10 disposed in a control facility 7 constructed in a mine, a communication system 9, a dump truck 2, a mining machine 3 that is a different mining machine 4 different from the dump truck 2. The management device 10 is installed in the mine control facility 7 and substantially stationary. Note that the management device 10 may also be movable. The communication system 9 performs radio communication for data or a command signal between the management device 10, dump truck 2, and different mining machine 3. The communication system 9 enables bidirectional radio communication between the management device 10 and the dump truck 2, between the management device 10 and the different mining machine 3, and between the dump truck 2 and the different mining machine 3. In the first embodiment, the communication system 9 has a plurality of repeaters 6 to relay data or a command signal (radio wave).

In the first embodiment, a position of the dump truck 2 and a position of the different mining machine 3 are detected by utilizing a real time kinematic-global navigation satellite system (RTK-GNSS). The GNSS represents a global navigation satellite system. A global positioning system (GPS) is exemplified as an example of the global navigation satellite system. The RTK-GNSS has a plurality of positioning satellites 5. The RTK-GNSS detects a position defined by a coordinate data including a latitude, a longitude, and an altitude. The position detected by the RTK-GNSS is an absolute position defined in the global coordinate system.

With the RTK-GNSS, a position of the dump truck 2 and a position of the different mining machine 3 in the mine are detected.

In the following description, a position detected by the RTK-GNSS will be suitably referred to as a GPS position. The GPS position is an absolute position, and is coordinate data including a latitude, a longitude, and an altitude. In the RTK-GNSS, a positioning state is changed by influence of at least one of arrangement of the positioning satellites 5, an ionosphere, a troposphere, and a topography around an antenna that receives data from each positioning satellite 5. The positioning state includes a fix solution (accuracy from ±1 cm to 2 cm), a float solution (accuracy from ±10 cm to several m), a single solution (accuracy of about ±several m), and a non-positioning state (impossible to perform positioning calculation).

In an XY coordinate system defined by an X-axis direction inside a horizontal plane and a Y-axis direction inside the horizontal plane orthogonal to the X-axis direction, the management system 1 manages a position and an azimuth direction of the dump truck 2 and a position and an azimuth direction of the different mining machine 3 in the mine. The azimuth direction of the dump truck 2 and the azimuth direction of the different mining machine 3 are managed by setting the north at zero degrees, the east at 90 degrees, the south at 180 degrees, and the west at 270 degrees. The azimuth direction of the dump truck 2 and the azimuth direction of the different mining machine 3 correspond to advancing directions of the dump truck 2 and the different mining machine 3 which are traveling.

Management Device

Next, the management device 10 disposed in the control facility 7 will be described. The management device 10 transmits data and a command signal to a dump truck 2 and receives data from the dump truck 2. As illustrated in FIG. 1, the management device 10 includes a computer 11, a display device 16, an input device 17, a radio communication device 18, and a GPS base station 19.

The computer 11 includes a processing device 12, a storage device 13, and an input/output unit (input/output interface) 15. The display device 16, input device 17, radio communication device 18, and GPS base station 19 are connected to the computer 11 via the input/output unit 15.

The processing device 12 executes various kinds of processing related to management for a dump truck 2 and various kinds of processing related to management for the different mining machine 3. The processing device 12 processes positional data of the dump truck 2 and positional data of the different mining machine 3 acquired via the communication system 9.

The processing device 12 sets a travel route RP on which the dump truck 2 travels. The travel route RP is defined by course data. The course data is a group of a plurality of points in which absolute positions are defined respectively. The processing device 12 functions as a course data generating unit that generates course data of the dump truck 2. The processing device 12 generates the course data and sets the travel route RP.

The storage device 13 is connected to the processing device 12. The storage device 13 stores various kinds of data related to management for the dump truck 2 and various kinds of data related to management for the different mining machine 3. The storage device 13 stores positional data of the dump truck 2 and positional data of the different mining machine 3. The storage device 13 stores a computer program in order to cause the processing device 12 to execute various kinds of processing.

The display device 16 includes a flat panel display like a liquid crystal display. The display device 16 can display positional data of the dump truck 2 and positional data of the different mining machine 3. The input device 17 includes at least one of a keyboard, a touch panel, and a mouse. The input device 17 functions as an operation unit capable of receiving an operation signal in the processing device 12.

The radio communication device 18 is disposed in the control facility 7. The radio communication device 18 is a part of the communication system 9. The radio communication device 18 is connected to the processing device 12 via the input/output unit 15. The radio communication device 18 has an antenna 18A. The radio communication device 18 can receive data transmitted from at least one of the dump truck 2 and the different mining machine 3. The data received by the radio communication device 18 is output to the processing device 12 and stored in the storage device 13. The radio communication device 18 can transmit data to at least one of the dump truck 2 and the different mining machine 3.

The GPS base station 19 is disposed in the control facility 7. The GPS base station 19 includes: an antenna 19A that receives data from the plurality of positioning satellites 5; and a transmitter/receiver 19B connected to the antenna 19A. The transmitter/receiver 19B includes a receiver to receive data from a positioning satellite 5 via the antenna 19A, a transmitter to transmit data to the dump truck 2 via an antenna 19C, and an arithmetic processing device including a microprocessor such as a central processing unit (CPU), and a storage device having a memory such as a read only memory (ROM) or a random access memory (RAM). The transmitter/receiver 19B calculates a GPS position of the GPS base station 19 on the basis of data received via the antenna 19A, and generates correction observation data to correct the GPS position of the dump truck 2. The transmitter/receiver 19B transmits the correction observation data to the dump truck 2 and the different mining machine 3 via the antenna 19C.

The computer 11 includes the input/output unit 15 for communication, an arithmetic processing device having a microprocessor such as a central processing unit (CPU) to execute a control program, an external storage device such as a read only memory (ROM) to store the control program, a main storage device (internal storage device) such as a random access memory (RAM) used as a work area of the CPU, and an external storage device (auxiliary storage device) such as a nonvolatile memory in which data is registered by the CPU. The functions of the processing device 12 are implemented by the CPU reading the control program stored in the ROM and executing the same in the work area of the RAM. The functions of the storage device 13 are implemented by the ROM storing the control program and having the data registered in the nonvolatile memory by the CPU. The nonvolatile memory includes at least one of a flash memory and a hard disk drive and implements a database 13B. Note that the functions of the processing device 12 and the storage device 13 may also be implemented by cooperation of a plurality of processing circuits.

Different Mining Machine

Next, a different mining machine 3 will be described. The different mining machine 3 is a mining machine other than a dump truck 2 and actuated by operation of a worker. The different mining machine 3 includes: a processing device including a central processing unit (CPU) and executing various kinds of processing related to work content; a GPS receiver to detect a GPS position; and a radio communication device to exchange data with the radio communication device 18 of the control facility 7. In the different mining machine 3, the radio communication device transmits a GPS position to the radio communication device 18 of the control facility 7 at a predetermined time interval.

Dump Truck

Figure 2:
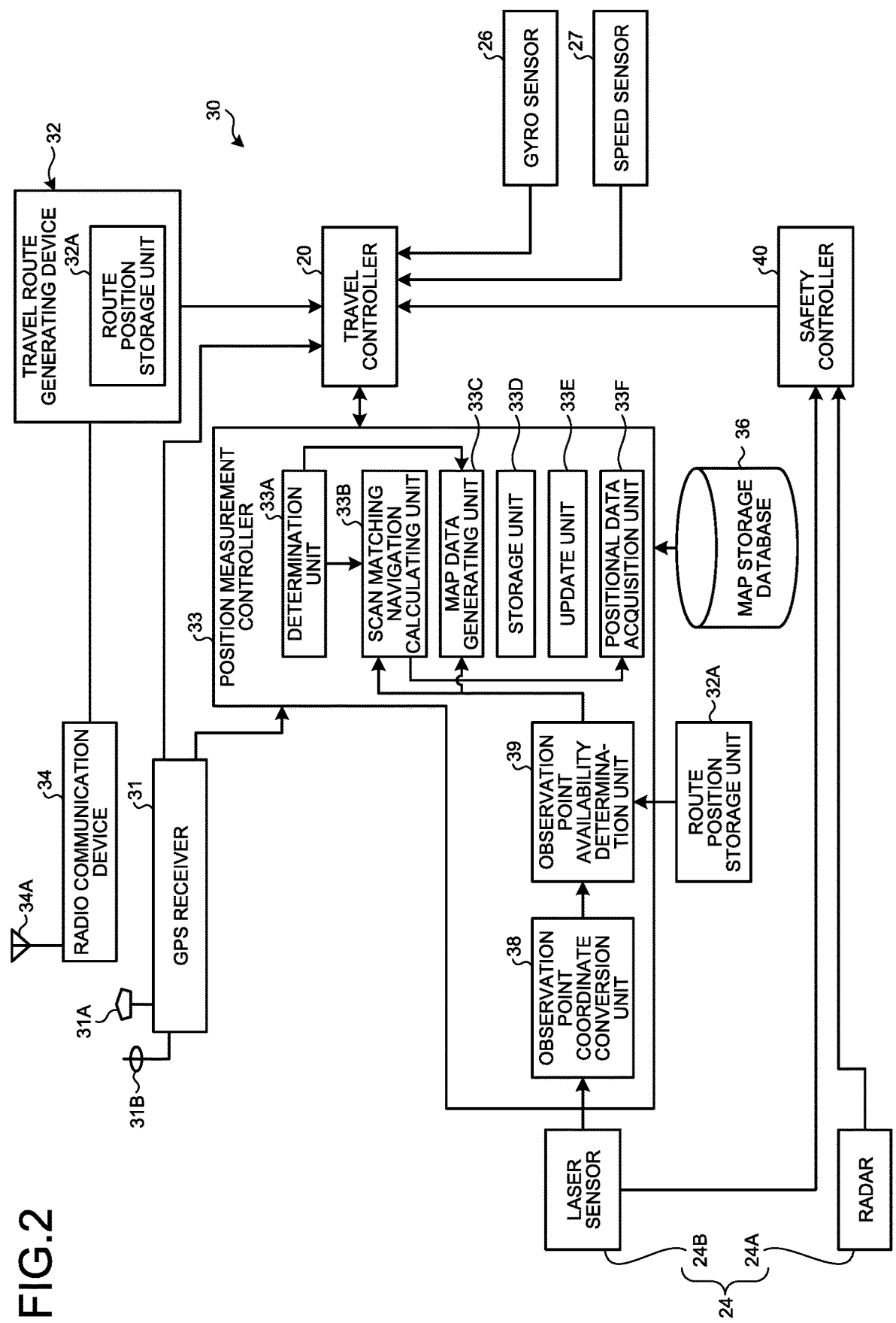
FIG. 2 is a control block diagram of a dump truck according to the first embodiment.
Figure 3:
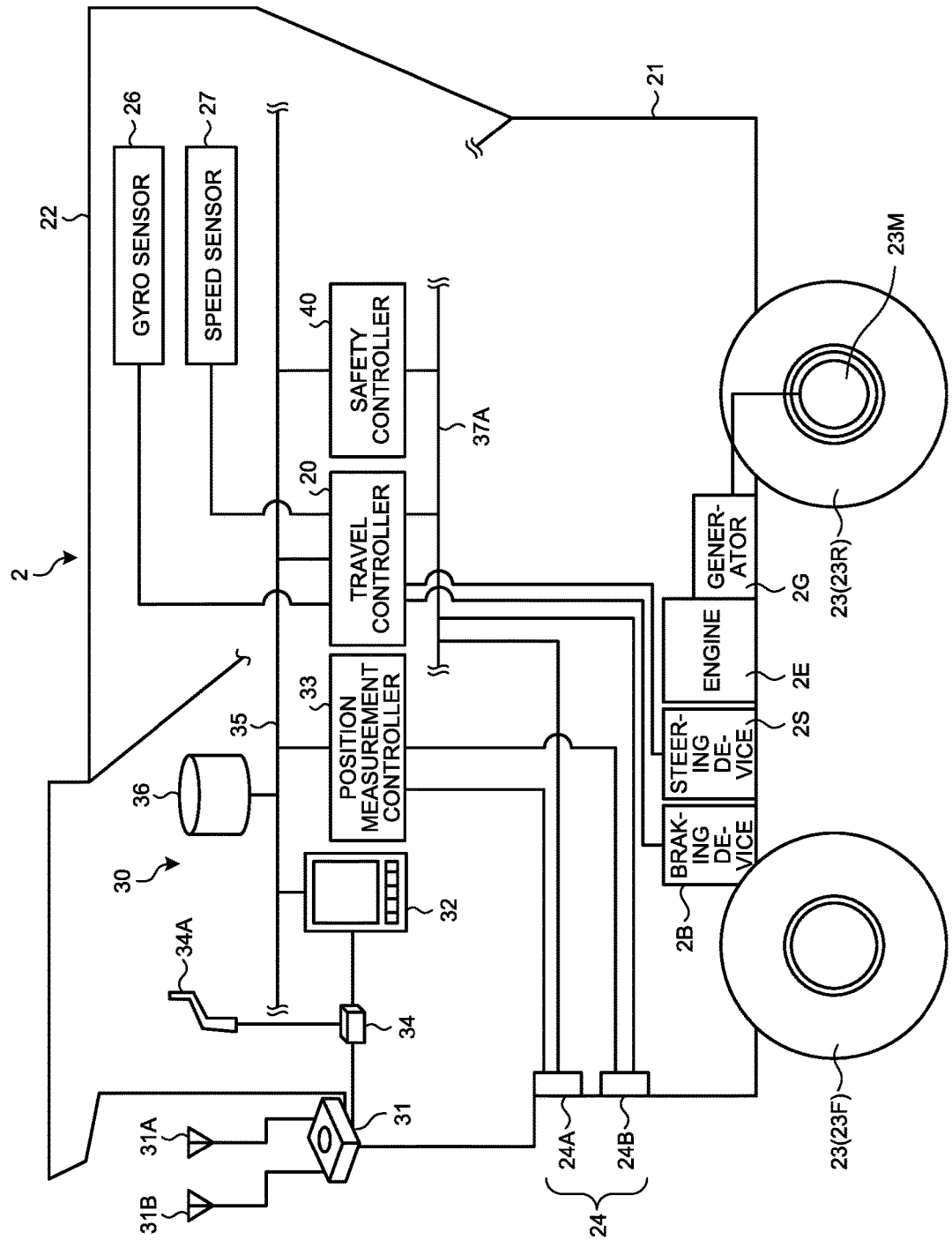
FIG. 3 is a hardware configuration diagram of the dump truck according to the first embodiment.

Next, a dump truck 2 will be described. FIG. 2 is a control block diagram of the dump truck 2 according to the first embodiment. FIG. 3 is a hardware configuration diagram of the dump truck 2 according to the first embodiment.

As illustrated in FIG. 3, the dump truck 2 includes a vehicle body 21, a vessel 22, wheels 23, a non-contact sensor 24, and a control system 30. The vehicle body 21 is provided with an internal combustion engine 2E like a diesel engine, a generator 2G actuated by the internal combustion engine 2E, and an electric motor 23M actuated by electric power generated by the generator. The wheels 23 include front wheels 23F and rear wheels 23R. The rear wheels 23R are driven by the electric motor 23M. Meanwhile, power of the internal combustion engine 2E may be transmitted to the rear wheels 23R via a transmission including a torque converter. Additionally, the vehicle body 21 is provided with a steering device 2S to steer the front wheels 23F. On the vessel 22, matters to be loaded are loaded by a loading machine. In discharging work, the vessel 22 is lifted, and the loaded matters are discharged from the vessel 22.

The non-contact sensor 24 is disposed at a lower portion of a front portion of the vehicle body 21. The non-contact sensor 24 detects an object around the dump truck 2 in a non-contact manner. The object around the dump truck 2 includes an object (obstacle) existing in the travel route RP and an object (bank BK) existing beside the travel route RP. The non-contact sensor 24 functions as an obstacle sensor that detects an obstacle ahead of the dump truck 2 in a non-contact manner.

The non-contact sensor 24 can detect a relative position of the object with respect to the non-contact sensor 24 (dump truck 2). The non-contact sensor 24 includes a radar 24A and a laser sensor 24B. Resolution performance of the laser sensor 24B is higher than resolution performance of the radar 24A.

The non-contact sensor 24 including the radar 24A and the laser sensor 24B is connected to a second communication line 37A of the control system 30. The laser sensor 24B is connected to a position measurement controller 33 of the control system 30.

Control System for Work Machine

Next, the control system 30 for a work machine will be described. FIG. 4 is a diagram illustrating a part of map data MI stored in a map storage database 36 of the control system 30 according to the first embodiment. FIG. 5 is an enlarged view of a portion XIV in FIG. 4.

The control system 30 is installed in a dump truck 2. The control system 30 causes the dump truck 2 to autonomously travel along the travel route RP. As illustrated in FIG. 3, the control system 30 includes a gyro sensor 26, a speed sensor 27, a GPS receiver 31, a travel route generating device 32, a position measurement controller 33, a travel controller 20, the non-contact sensor 24, a radio communication device 34, and the map storage database 36. Additionally, the control system 30 includes a first signal line 35, a second signal line 37, and a safety controller 40.

As illustrated in FIG. 3, the travel controller 20, travel route generating device 32, position measurement controller 33, map storage database 36, and safety controller 40 are connected to the first communication line 35. The travel controller 20, travel route generating device 32, position measurement controller 33, map storage database 36, and safety controller 40 perform data communication via the first communication line 35. The travel controller 20 and the safety controller 40 are also connected to the second communication line 37A. The travel controller 20 and the safety controller 40 perform data communication via the second communication line 37A. In the first embodiment, the communication standards using the first communication line 35 and the second communication line 37A correspond to a controller area network (CAN) standardized as ISO 11898 and ISO 11519.

The gyro sensor 26 detects an azimuth direction of the dump truck 2 (change amount in azimuth direction). The gyro sensor 26 is connected to the travel controller 20. The gyro sensor 26 outputs detection data to the travel controller 20. The travel controller 20 calculates an azimuth direction (change amount in azimuth direction) of the dump truck 2 on the basis of detection data obtained by the gyro sensor 26.

The speed sensor 27 detects a travel speed of the dump truck 2. The speed sensor 27 detects a rotation speed of the wheels 23 to detect the travel speed of the dump truck 2. The speed sensor 27 is connected to the travel controller 20. The speed sensor 27 outputs detection data to the travel controller 20. The travel controller 20 calculates a moved distance of the dump truck 2 on the basis of detection data obtained by the speed sensor 27 and time data measured by a timer built inside the travel controller 20.

The GPS receiver 31 is provided in the dump truck 2. The GPS receiver 31 is a position detecting device to detect an absolute position (GPS position) of the dump truck 2. The GPS receiver 31 is connected to: an antenna 31A that receives data from a positioning satellite 5; and an antenna 31B that receives correction observation data from the GPS base station 19. The antenna 31A outputs, to the GPS receiver 31, a signal based on data received from a positioning satellite 5. The antenna 31B outputs, to the GPS receiver 31, a signal based on received correction observation data. The GPS receiver 31 detects a position of the antenna 31A (GPS position) by using data from a positioning satellite 5 and correction observation data from the GPS base station 19. The GPS receiver 31 finds a distance to an arbitrary positioning satellite 5 by comparing data from the positioning satellite 5 with the correction observation data from the GPS base station 19, checks a phase of a radio wave from the positioning satellite 5, and detects a position of the antenna 31A.

The GPS receiver 31 detects a position of the dump truck 2 (GPS position) by detecting the position of the antenna 31A. In the course of detecting the position of the antenna 31A, the GPS receiver 31 detects any one of a fix solution, a float solution, and a single solution to indicate detection accuracy of a GPS position on the basis of, for example, the number of the positioning satellites 5 from which the antenna 31A has received data.

In the first embodiment, a GPS position of a fix solution has accuracy corresponding to accuracy with which the dump truck 2 can perform autonomous travel. A GPS position of the float solution and a GPS position of the single solution have accuracy corresponding to accuracy with which the dump truck 2 cannot perform autonomous travel.

In a case of detecting any one of the fix solution, float solution, and single solution indicating the accuracy of a detected GPS position, the GPS receiver 31 indicates accuracy of the GPS position and also outputs a positioning signal to indicate a fact that the GPS position has been subjected to positioning calculation. In a case where the GPS position cannot be subjected to positioning calculation, the GPS receiver 31 outputs a non-positioning signal indicating a non-positioning state. A positioning signal or a non-positioning signal is output to the travel controller 20 and the position measurement controller 33 via the travel route generating device 32.

As illustrated in FIG. 2, the travel route generating device 32 includes a route position storage unit 32A that stores course data generated by the processing device 12 of the management device 10. The travel route generating device 32 is connected to the radio communication device 34 to which an antenna 34A is connected. The radio communication device 34 can receive a command signal or data transmitted from at least one of the management device 10 and a mining machine 4 other than the own vehicle. The mining machine 4 other than the own vehicle includes: a mining machine 4 other than a dump truck 2 such as a boring machine, an excavating machine, a loading machine, a hauling machine, and a vehicle driven by a worker; and a dump truck 2 other than the own vehicle.

The radio communication device 34 receives the course data transmitted from the radio communication device 18 of the control facility 7 and positional data of the mining machine 4 other than the own vehicle, and outputs the same to the travel route generating device 32 and the position measurement controller 33. The course data and the positional data of the mining machine 4 other than the own vehicle are defined in the XY coordinate system. The travel route generating device 32 receives the course data and the positional data of the mining machine 4 other than the own vehicle from the radio communication device 34 and stores the same in the route position storage unit 32A. Additionally, the travel route generating device 32 transmits, to the radio communication device 18 of the control facility 7 via the radio communication device 34, positional data and azimuth direction data of the dump truck 2 corresponding to the own device and detected by the travel controller 20 or a scan matching navigation calculating unit 33B of the position measurement controller 33. Furthermore, the travel route generating device 32 is connected to the first communication line 35.

Each of the travel route generating device 32, travel controller 20, and position measurement controller 33 includes a computer. These computers are actuated in accordance with a read computer program.

The travel controller 20 receives positional data indicating a GPS position of the dump truck 2 detected by the GPS receiver 31 and positional data indicating an absolute position of the dump truck 2 calculated by the scan matching navigation calculating unit 33B of the position measurement controller 33. The travel controller 20 causes the dump truck 2 to autonomously travel along the travel route RP defined by the course data on the basis of at least one of the positional data indicating the GPS position of the dump truck 2 detected by the GPS receiver 31 and the positional data indicating the absolute position of the dump truck 2 calculated by the scan matching navigation calculating unit 33B of the position measurement controller 33.

The travel controller 20 acquires not only the positional data of the dump truck 2 but also azimuth direction data indicating an azimuth direction (change amount in azimuth direction) of the dump truck 2, namely, detection data obtained by the gyro sensor 26, and travel speed data indicating a travel speed of the dump truck 2, namely, detection data obtained by the speed sensor 27.

The travel controller 20 calculates a position and an azimuth direction of the dump truck 2 on the basis of positional data of the dump truck 2, namely, detection data obtained by the GPS receiver 31, the travel speed data of the dump truck 2, namely, the detection data obtained by the speed sensor 27, and azimuth direction data of the dump truck 2, namely, the detection data obtained by the gyro sensor 26. The travel controller 20 detects the position and the azimuth direction by integrating the travel speed, namely, a detection result from the speed sensor 27 by using time data from the timer on the basis of: a GPS position at the time of receiving the GPS position from the GPS receiver 31; and the azimuth direction, namely, a detection result from the gyro sensor 26. The travel controller 20 converts the GPS position into a position in the XY coordinate system at any timing from among before detection, during detection, or after detection of the position and the azimuth direction.

The travel controller 20 controls at least one of an accelerator, a braking device 23B, and the steering device 2S of the dump truck 2 such that the position of the dump truck 2 coincides with the travel route RP, in other words, the dump truck 2 travels along the travel route RP. With such control, the travel controller 20 causes the dump truck 2 to travel along the travel route RP. The functions of the travel controller 20 are implemented by the CPU reading the control program stored in the ROM, and executing the program in the work area of the RAM. Additionally, the functions of the travel controller 20 may also be implemented by cooperation of a plurality of processing circuits.

As illustrated in FIG. 2, the position measurement controller 33 includes a determination unit 33A, the scan matching navigation position calculating unit 33B, a map data generating unit 33C, a storage unit 33D, an update unit 33E, and a positional data acquisition unit 33F.

The position measurement controller 33 is connected to the first communication line 35. The position measurement controller 33 acquires, via the first communication line 35 and the travel controller 20, detection data obtained by the gyro sensor 26 and detection data obtained by the speed sensor 27. Furthermore, the position measurement controller 33 is connected to the GPS receiver 31 via the radio communication device 34, travel route generating device 32, and first communication line 35. The position measurement controller 33 acquires detection data obtained by the GPS receiver 31.

When the dump truck 2 travels on the travel route RP, the position measurement controller 33 generates map data MI of the travel route RP including positional data of a bank BK, and stores the same in the map storage database 36 on the basis of positional data of the dump truck 2 detected by the GPS receiver 31 and positional data of the bank BK located outside the travel route RP and detected by the laser sensor 24B.

The determination unit 33A determines whether an error of a GPS position detected by the GPS receiver 31 is a predetermined error or less. The determination unit 33A determines whether a solution of the GPS position is a fix solution. In a case where a solution of a GPS position is a fix solution, the determination unit 33A determines that accuracy of the detected GPS position of the dump truck 2 is highly accurate and the error of the GPS position is the predetermined error or less. In a case where a solution of a GPS position is a float solution or a single solution or in a case where a GPS position is in a non-positioning state, the determination unit 33A determines that: accuracy of the detected GPS position of the dump truck 2 has low accuracy; and the error of the GPS position exceeds the predetermined error. Meanwhile, the predetermined error is an error (accuracy) of a GPS position with which the dump truck 2 can autonomously travel along the travel route RP by dead reckoning navigation described later. In the first embodiment, the GPS receiver 31 detects a GPS position and a solution, but another device (such as the determination unit 33A) may also detect a solution.

When the determination unit 33A determines that an error of a GPS position of the dump truck 2 detected by the GPS receiver 31 is the predetermined error or less, the map data generating unit 33C detects a position of at least one or more banks BK located outside the loading place LPA, outside the discharging place DPA, and outside the hauling path HL on the basis of a detection result obtained by the gyro sensor 26, a detection result obtained by the speed sensor 27, and a detection result obtained by the laser sensor 24B, and stores positional data of the bank BK in the map storage database 36 as map data MI of the travel route RP. The map data generating unit 33C integrates the position and azimuth direction of the dump truck 2 detected by the determination unit 33A with the detection result obtained by the laser sensor 24B, and detects a position of the bank BK by deleting a detection result other than the bank BK from the integrated data. Additionally, the map data generating unit 33C performs saving in the map storage database 36. As illustrated in FIGS. 4 and 5, the map data MI indicates a position in the XY coordinate system formed of grids GR that section a mine into square shapes (rectangular or square shapes) each having a predetermined size in a planar view, and further indicates whether a bank BK exists in each grid GR. Each grid GR of the map data MI includes binary data (1 bit data), namely, "0" or "1" indicating whether a bank BK exists. As illustrated in FIG. 4 and FIG. 5, in the first embodiment, in a case where there is a bank BK, each grid GR of the map data MI indicates the bank with a black square as "1" in the drawing, and in a case where there is no bank BK, each grid GR indicates the fact with a white square as "0" in the drawing.

The map storage database 36 stores the positional data of a bank BK as map data MI of the travel route RP. The map storage database 36 is connected to the first communication line 35. The map storage database 36 is an external storage device (auxiliary storage device) including at least one of a read only memory (ROM), a flash memory, and a hard disk drive. When the determination unit 33A determines that an error of a GPS position of the dump truck 2 detected by the GPS receiver 31 is the predetermined error or less, the map storage database 36 extracts a detection result related to a bank BK surrounding the travel route RP from a detection result obtained by the laser sensor 24B, and stores the extracted detection result related to the bank BK as the map data MI of the travel route RP. Every time the map data generating unit 33C detects a detection result, the map storage database 36 stores the detection result detected by the map data generating unit 33C as the map data MI. In the first embodiment, every time the map data generating unit 33C performs detection, the map data MI stored in the map storage database 36 is overwritten, but not limited thereto.

The storage unit 33D is a main storage device (internal storage device) having an operation speed higher than that of the map storage database 36. The storage unit 33D is formed of a random access memory (RAM).

The update unit 33E causes the storage unit 33D to read at least a part of the map data MI stored in the map storage database 36.

When the determination unit 33A determines that an error of a GPS position of the dump truck 2 detected by the GPS receiver 31 exceeds the predetermined error, the scan matching navigation calculating unit 33B calculates a position and an azimuth direction of the dump truck 2 on the basis of a detection result obtained by the gyro sensor 26, a detection result obtained by the speed sensor 27, and a detection result obtained by the laser sensor 24B, and map data MI read into the storage unit 33D from the map storage database 36 and stored in the storage unit 33D.

The positional data acquisition unit 33F acquires positional data indicating an absolute position of the dump truck 2. The positional data indicating an absolute position of the dump truck 2 is detected by the GPS receiver 31. Furthermore, the positional data indicating the absolute position of the dump truck 2 is calculated by the scan matching navigation calculating unit 33B. The positional data acquisition unit 33F acquires the positional data indicating the absolute position of the dump truck 2 from at least one of the GPS receiver 31 and the scan matching navigation calculating unit 33B.

Additionally, when the travel route generating device 32 receives the course data from the radio transmission device 34, the position measurement controller 33 transmits, to the radio communication device 18 of the control facility 7 via the radio communication device 34, the positional data and the azimuth direction data of the dump truck 2 corresponding to the own vehicle and detected by the GPS receiver 31 or the scan matching navigation calculating unit 33B.

Furthermore, as illustrated in FIG. 2, the position measurement controller 33 includes an observation point coordinate conversion unit 38 and an observation point availability determination unit 39. The observation point coordinate conversion unit 38 converts, into the XY coordinate system, a position of a detection result obtained by the laser sensor 24B and indicated by coordinates defined by a direction and a distance from the laser sensor 24B. The position of the detection result having the coordinates subjected to conversion by the observation point coordinate conversion unit 38 is defined by not only an X-axis direction and a Y-axis direction but also by a height direction (Z axis direction) orthogonal to the X-axis direction and the Y-axis direction. The observation point availability determination unit 39 acquires, from the route position storage unit 32A, positional data of a mining machine 4 other than the own vehicle. The observation point availability determination unit 39 removes, from the detection result having the coordinates subjected to conversion by the observation point coordinate conversion unit 38, various kinds of noise, a detection result related to a height equal to or less than a predetermined height from the ground surface, and a detection result estimated to be obtained by detecting a mining machine 4 other than the own vehicle. The observation point availability determination unit 39 combines a detection result obtained by a grid GR with a detection result obtained by the laser sensor 24B from which the noise has been removed. The observation point availability determination unit 39 outputs the combined detection result to both of the map data generating unit 33C and the scan matching navigation calculating unit 33B.

The safety controller 40 obtains a relative position between the dump truck 2 and an object (obstacle) on the basis of detection signals from the radar 24A and the laser sensor 24B, and outputs the relative position to the travel controller 20. The travel controller 20 generates a command to control at least one of the accelerator, braking device 23B, and steering device 2S by using the relative position relative to the object, controls the dump truck 2 on the basis of the command, and prevents the dump truck 2 from colliding with the object.

Additionally, the travel controller 20 outputs a command to cause the travel controller 20 to control the braking device 23B adapted to stop the vehicle body 21 in a case where the determination unit 33A that a solution of the GPS position is a float solution or a single solution or in a case where a GPS position continues to be a non-positioning state for a predetermined time or more and the scan matching navigation calculating unit 33B can acquire only a detection result from the laser sensor 24B with estimated accuracy and reliability lower than a predetermined value and predetermined reliability with reference to the map data MI stored in the map storage database 36.

Travel Mode of Dump Truck 2

Figure 6:
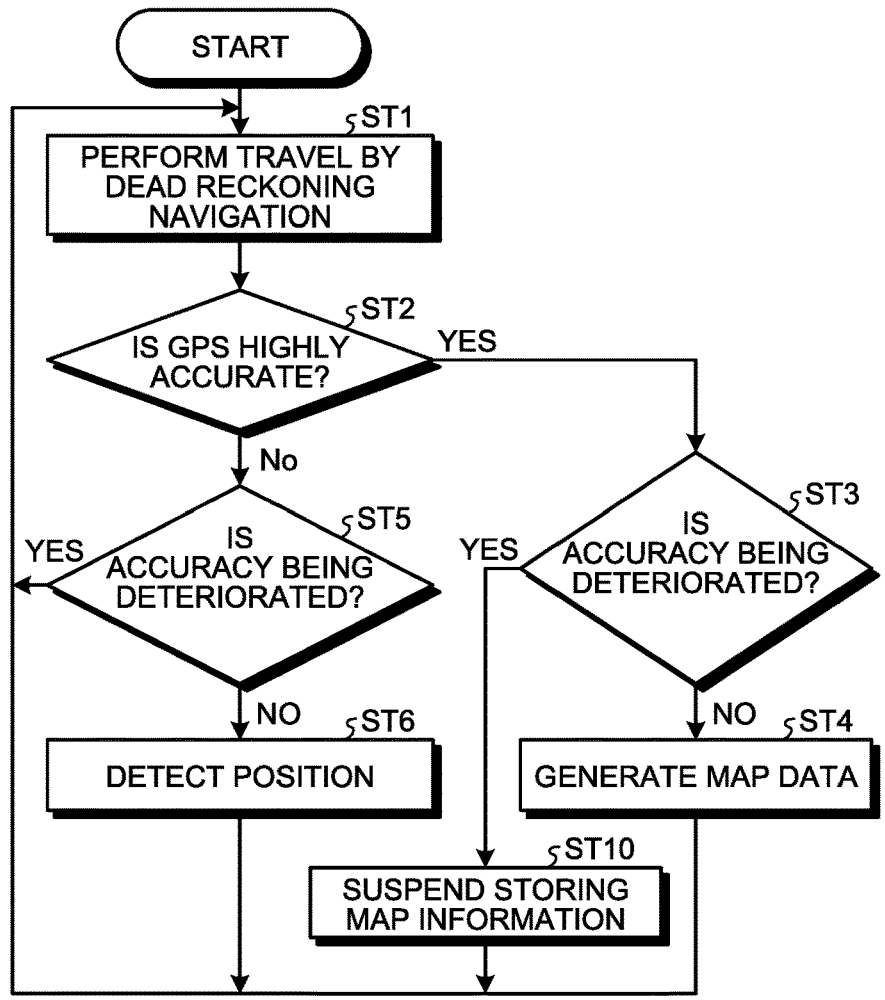
FIG. 6 is an exemplary flowchart of the control system according to the first embodiment.
Figure 7:
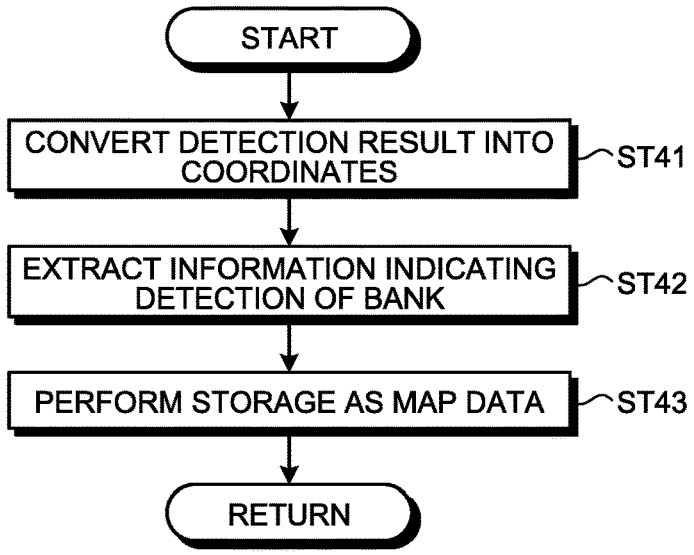
FIG. 7 is an exemplary flowchart in step ST4.
Figure 8:
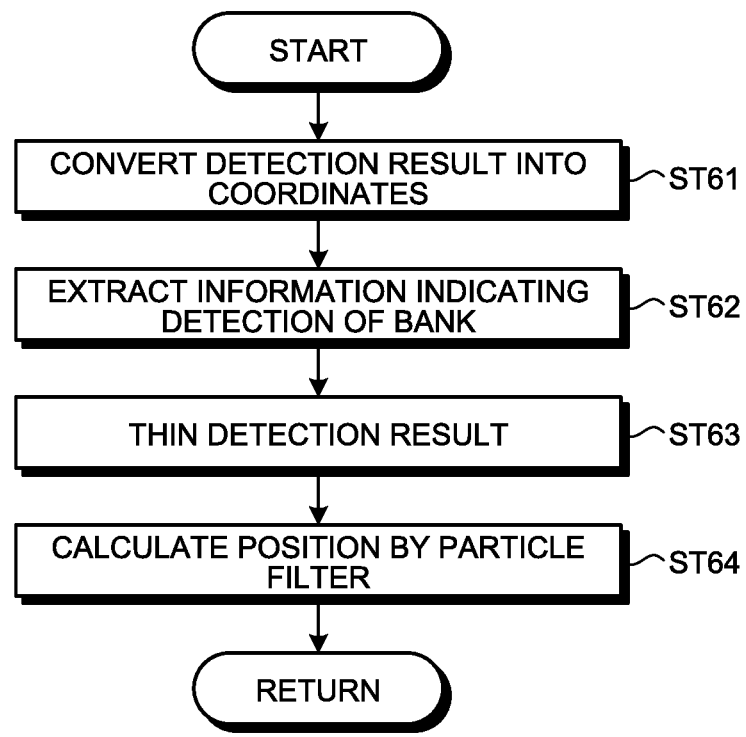
FIG. 8 is an exemplary flowchart in step ST6.

Next, exemplary travel modes of the dump truck 2 according to the first embodiment will be described. FIG. 6 is an exemplary flowchart of the control system 30 according to the first embodiment. FIG. 7 is an exemplary flowchart in step ST4 of FIG. 6. FIG. 8 is an exemplary flowchart in step ST6 of FIG. 6.

In a case of making the dump truck 2 travel along the travel route RP, the processing device 12 transmits a command signal to the travel route generating device 32 and the position measurement controller 33 of the dump truck 2 via the radio communication device 18. The command signal includes travel condition data indicating travel conditions of the dump truck 2 and positional data of a mining machine 4 other than the own vehicle. The travel condition data includes course data generated by the processing device 12 and travel speed data of the dump truck 2. The travel route generating device 32 stores, in the route position storage unit 32A, the course data and the positional data of the mining machine 4 other than the own vehicle out of the command signal transmitted from the processing device 12 via the communication system 9. When the travel route generating device 32 receives the command signal from the processing device 12, the position measurement controller 33 transmits, to the processing device 12, positional data and azimuth direction data of the dump truck 2 corresponding to the own vehicle via the radio communication device 34. The travel controller 20 controls travel of the dump truck 2 by controlling the accelerator, braking device 23B, and steering device 2S of the dump truck 2 on the basis of the command signal from the processing device 12.

In the first embodiment, the management device 10 makes the dump truck 2 travel along the travel route RP in exclusive three travel modes. A first travel mode is a dead reckoning navigation travel mode in which the dump truck 2 is made to travel on the basis of the dead reckoning navigation. A second travel mode is a GPS travel mode in which the dump truck 2 is made to travel on the basis of detection data obtained by the GPS receiver 31. A third travel mode is a scan matching navigation travel mode in which positional data indicating an absolute position of the dump truck 2 is calculated on the basis of map data MI and detection data obtained by the non-contact sensor 24, and the dump truck 2 is made to travel on the basis of the calculated positional data of the dump truck 2. In the scan matching navigation travel mode, the positional data of the dump truck 2 is calculated in the scan matching navigation calculating unit 33B. In the case of making the dump truck 2 travel in the scan matching navigation travel mode, map data generating processing is performed, and map data MI generated in the map data generating processing is stored in the map storage database 36.

The dead reckoning navigation is a navigation in which a current position of an object (dump truck 2) is estimated on the basis of an azimuth direction (change amount in azimuth direction) and a moved distance from a known position. The azimuth direction (change amount in azimuth direction) of the dump truck 2 is detected by using the gyro sensor 26 disposed in the dump truck 2. The moved distance of the dump truck 2 is detected by using the speed sensor 27 disposed in the dump truck 2. A detection signal from the gyro sensor 26 and a detection signal from the speed sensor 27 are output to the travel controller 20 of the dump truck 2.

The travel controller 20 can obtain an azimuth direction (change amount in azimuth direction) of the dump truck 2 from a known start point on the basis of a detection signal from the gyro sensor 26. The travel controller 20 can obtain a moved distance of the dump truck 2 from the known start point on the basis of a detection signal from the speed sensor 27. The travel controller 20 controls a control amount related to travel of the dump truck 2 on the basis of a detection signal from the gyro sensor 26 and a detection signal from the speed sensor 27 such that the dump truck 2 travels in accordance with course data set for the travel route RP. The control amount includes an accelerator signal, a braking signal, and a steering signal. The travel controller 20 controls travel (operation) of the dump truck 2 on the basis of the steering signal, accelerator signal, and braking signal.

When a travel distance of the dump truck 2 by the dead reckoning navigation becomes long, an error may be caused between an estimated position (position estimated) and an actual position due to accumulation of detection errors of one or both of the gyro sensor 26 and the speed sensor 27. As a result, the dump truck 2 may travel in a manner deviated from the course data generated by the processing device 12. In the first embodiment, the travel controller 20 makes the dump truck 2 travel while correcting, by using GPS positional data detected by the GPS receiver 31 and positional data calculated by the scan matching navigation calculating unit 33B, a position (estimated position) of the dump truck 2 derived (estimated) by the dead reckoning navigation.

In other words, in the first embodiment, the dump truck 2 is made to travel by combining the dead reckoning navigation travel mode with at least one of the GPS travel mode and the scan matching navigation travel mode. Meanwhile, the dump truck 2 may travel only in the dead reckoning navigation travel mode, may travel only in the GPS travel mode, or may travel only in the scan matching navigation travel mode.

The travel controller 20 calculates a control amount, which is related to travel of the dump truck 2 and includes a correction amount to correct a position of the dump truck 2, on the basis of a detection signal from the gyro sensor 26, a detection signal from the speed sensor 27, and a GPS position from the GPS receiver 31, or a position detected by the scan matching navigation calculating unit 33B such that the dump truck 2 travels along the travel route RP defined by course data. The travel controller 20 controls travel (operation) of the dump truck 2 on the basis of the calculated correction amount and control amount such that the dump truck 2 travels along the travel route RP.

The travel controller 20 of the control system 30 executes step ST1 in which the dump truck 2 is made to travel by the dead reckoning navigation in accordance with the course data set in the travel route RP on the basis of a GPS position of the dump truck 2 detected by the GPS receiver 31. In the first embodiment, the travel controller 20 makes the dump truck 2 travel in at least a part of the loading place LPA, discharging place DPA, and hauling path HL in accordance with the course data generated by the processing device 12 of the management device 10 and the travel condition data including a travel speed (target travel speed) set by the processing device 12.

Next, the determination unit 33A of the position measurement controller 33 executes step ST2 in which determination is made on whether an error of a GPS position of the dump truck 2 detected by the GPS receiver 31 is a predetermined error or less. In other words, in step ST2, the determination unit 33A of the position measurement controller 33 determines whether accuracy of the GPS position of the dump truck 2 detected by the GPS receiver 31 is highly accurate. More specifically, the determination unit 33A of the position measurement controller 33 determines whether a solution of the GPS position detected by the GPS receiver 31 is a fix solution. The determination unit 33A of the position measurement controller 33 determines that the solution of the GPS position detected by the GPS receiver 31 is a fix solution, in other words, an error of the GPS position of the dump truck 2 detected by the GPS receiver 31 is the predetermined error or less (step ST2: Yes), it is determined whether a state of the dump truck 2 is in a state of deteriorating accuracy of the map data MI, in other words, whether data related to a position of a detected bank BK deteriorates accuracy of the map data MI stored in the map storage database 36 (step ST3). More specifically, in the first embodiment, the determination unit 33A of the position measurement controller 33 determines whether the travel speed of the dump truck 2 is zero on the basis of a detection signal from the speed sensor 27, in other words, whether the dump truck 2 having the state of the dump truck 2 being in the state of deteriorating the accuracy of the map data MI is stopped. The reason is that: in the case where the dump truck 2 with the travel speed of zero is stopped, noise may be mixed into the map information MI due to dust and the like generated from operation of a mining machine 4 other than the own vehicle, and accuracy of the map information MI may be deteriorated.

In the case where the determination unit 33A of the position measurement controller 33 determines that the dump truck 2 is not stopped, in other words, determines that the state of the dump truck 2 is not in the state of deteriorating accuracy of the map data MI (step ST3: No), the map data generating processing is performed by the map data generating unit 33C. The map data generating unit 33C generates the map data MI (step ST4). In other words, in a case of determining that an error of the GPS position detected by the GPS receiver 31 is the predetermined error or less, the position measurement controller 33 executes step ST4 to make the dump truck 2 autonomously travel in accordance with course data stored in the route position storage unit 32A on the basis of the GPS position of the dump truck 2 detected by the GPS receiver 31, and also extract a detection result related to a bank BK from a detection result obtained by the laser sensor 24B, and then stores the extracted detection result related to the bank BK in the map storing database 36 as the map data MI of the travel route RP. More specifically, first, the observation point coordinate conversion unit 38 converts, into a position of coordinates indicated by X-Y coordinates, a position of a detection result obtained by the laser sensor 24B and indicated by coordinates defined with a direction and a distance from the laser sensor 24B (Step ST41).

The observation point availability determination unit 39 extracts the detection result related to the bank BK from the detection result having coordinates converted by the observation point coordinate conversion unit 38 (step ST42). At the time of extracting the detection result related to the bank BK, the observation point availability determination unit 39 first removes various kinds of noise from the detection result having the coordinates converted by the observation point coordinate conversion unit 38.

The observation point availability determination unit 39 combines the detection result subjected to removal of various kinds of noise with a detection result in which a position is indicated in the XY coordinate system and the grids GR each having a predetermined size are included. The observation point availability determination unit 39 outputs the combined detection result to both of the map data generating unit 33C and the scan matching navigation calculating unit 33B. The map data generating unit 33C of the position measurement controller 33 stores, as the map data MI of the travel route RP in the map storage database 36, the position of the bank BK that is the detection result combined by the observation point availability determination unit 39 (step ST43). Furthermore, with execution of step ST1 to step ST4, the control system 30 continues extracting a detection result related to a bank BK from a detection result obtained by the laser sensor 24B and storing the extracted detection result related to the bank BK as the map data MI of the travel route RP while an error of a GPS position of the dump truck 2 detected by the GPS receiver 31 is the predetermined error or less and the speed sensor 27 detects that the dump truck 2 is not stopped, in other words, while it is determined that the state of the dump truck 2 is not in the state of deteriorating accuracy of the map data MI.

When the determination unit 33A of the position measurement controller 33 determines that the dump truck 2 is stopped, in other words, determines that the state of the dump truck 2 is in the state of deteriorating accuracy of the map data MI (step ST3: Yes), storing the map data MI is suspended (step ST10), and the processing returns to step ST1. Thus, the ROM (external storage device) 333 of the position measurement controller 33 stores a program that causes the position measurement controller 33, namely, a computer to execute steps ST3, ST4, and ST10. When the determination unit 33A determines that the state of the dump truck 2 is in the state of deteriorating accuracy of the map data MI (step ST3: Yes), the control system 30 suspends storing the map data MI (step ST10) and returns to the step ST1, and with this processing, the map storage database 36 suspends storing the map data MI of the travel route RP while the speed sensor 27 detects that the dump truck 2 is stopped, in other words, while it is determined that the state of the dump truck 2 is in the state of deteriorating accuracy of the map data MI.

Furthermore, when the determination unit 33A of the position measurement controller 33 determines that a solution of a GPS position detected by the GPS receiver 31 is not a fix solution, in other words, determines that an error of the GPS position of the dump truck 2 detected by the GPS receiver 31 exceeds the predetermined error (step ST2: No), it is determined whether the state of the dump truck 2 is in the state of deteriorating position measurement accuracy, in other words, whether data related to a position of a bank BK and detected by the grid map generating unit 33C deteriorates position measurement accuracy stored in the map storage database 36 (step ST5). More specifically, in the first embodiment, the determination unit 33A of the position measurement controller 33 determines whether the travel speed of the dump truck 2 is zero on the basis of a detection signal from the speed sensor 27, in other words, determines whether the dump truck 2 having the state of the dump truck 2 being in the state of deteriorating position measurement accuracy is stopped. The reason is that: in a case where the dump truck 2 with the travel speed of zero is stopped, noise may be mixed in the detection result obtained by the laser sensor 24B due to dust and the like generated from operation of a mining machine 4 other than the own vehicle, and position measurement accuracy of the scan matching navigation calculating unit 33B may be deteriorated. Additionally, the reason is that the position of the dump truck 2 is not changed in the case where the dump truck 2 with the travel speed of zero is stopped.

In a case where the determination unit 33A of the position measurement controller 33 determines that the dump truck 2 is not stopped, in other words, determines the state of the dump truck 2 is not in the state of deteriorating position measurement accuracy (step ST5: No), the scan matching navigation calculating unit 33B calculates a position and an azimuth direction of the dump truck 2 on the basis of detection data obtained by the laser sensor 24B and the map data MI stored in the map storage database 36 and read into the storage unit 33D, and makes the dump truck 2 travel by the scan matching navigation along the travel route RP (step ST6). In other words, in a case of determining that an error of a GPS position detected by the GPS receiver 31 exceeds the predetermined error, the position measurement controller 33 matches a detection result obtained by the laser sensor 24B with the map data MI stored in the map storage database 36 and detects a position and an azimuth direction of the dump truck 2.

More specifically, the observation point coordinate conversion unit 38 converts, into a position of X-Y coordinates, the position of the detection result obtained by the laser sensor 24B and indicated by the coordinates defined by the direction and the distance from the laser sensor 24B (step ST61). The observation point availability determination unit 39 extracts a detection result related to a bank BK from the detection result having the coordinates converted by the observation point coordinate conversion unit 38 (step ST62). Meanwhile, in step ST61, performed is processing same as step ST41, and in step ST62, performed is processing same as step ST42, and therefore, a detailed description therefor will be omitted.

The scan matching navigation calculating unit 33B thins the detection result by passing, through an isolation filter, the detection result having noise removed by the observation point availability determination unit 39 (step ST63). More specifically, among the detection result having noise removed by the observation point availability determination unit 39, the scan matching navigation calculating unit 33B leaves only a detection result of a position distant in a predetermined distance, and removes other detection results. With the processing of step ST63, the detection result obtained by the laser sensor 24B can be reduced to about one fifth to one sixth.

The scan matching navigation calculating unit 33B integrates, by a particle filter PF, detection data obtained by the gyro sensor 26, detection data obtained by the speed sensor 27, detection data obtained by the laser sensor 24B, and map data MI stored in the map storage database 36 and read into the storage unit 33D, and calculates a position and an azimuth direction of the dump truck 2 (step ST64). A plurality of calculated positions and a plurality of calculated azimuth directions are used as a plurality of positions and a plurality of azimuth directions calculated in step ST641 when step ST6 is executed next.

Additionally, the scan matching navigation calculating unit 33B executes the dead reckoning navigation by using the detected position and azimuth direction (step ST1) and the position measurement controller 33 controls travel (operation) of the dump truck 2 such that the dump truck 2 travels along the travel route RP in a case where the calculated position and azimuth direction of the dump truck 2 do not fall under any one of: those detected from a detection result detected by the laser sensor 24B during breakage; those detected from a detection result detected by the gyro sensor 26 during breakage; those detected from the number of detection results less than the predetermined number obtained by the laser sensors 24B; those having reliability less than predetermined reliability; those having likelihood less than a predetermined value; those having estimation accuracy lower than a predetermined value, those in which a position and an azimuth direction based on the dead reckoning navigation are deviated larger than a predetermined value; and those detected by using map data MI having a problem. Thus, with execution of steps ST1, ST2, ST5, and ST6, the control system 1 continues detecting a position and an azimuth direction of the dump truck 2 by matching a detection result obtained by the laser sensor 24B with map data MI of the travel route RP stored in the map storage database 36 and the travel controller 20 makes the dump truck 2 travel along the travel route RP on the basis of the position and azimuth direction of the dump truck 2 detected by the position measurement controller 33 while detecting that an error of a GPS position of the dump truck 2 detected by the GPS receiver 31 exceeds the predetermined error and also while the speed sensor 27 detects that the dump truck 2 is not stopped, in other words, while it is determined that the state of the dump truck 2 is not in the state of deteriorating position measurement accuracy.

When the determination unit 33A of the position measurement controller 33 determines that the dump truck 2 is stopped, in other words, determines that the state of the dump truck 2 is in the state of deteriorating position measurement accuracy (step ST5: Yes), the processing returns to step ST1. When the determination unit 33A determines that the state of the dump truck 2 is in the state of deteriorating position measurement accuracy (step ST5: Yes), the processing returns to step ST1, and with this processing, the position measurement controller 33 suspends detecting a position and an azimuth direction of the dump truck 2 by matching the detection result obtained by the laser sensor 24B with the map data MI of the travel route RP stored in the map storage database 36 while the speed sensor 27 detects that the dump truck 2 is stopped, in other words, while it is determined that the state of the dump truck 2 is in the state of deteriorating the position measurement accuracy.

Operation of Dump Truck in Scan Matching Navigation Travel

As described above, in a case where a dump truck 2 travels on the travel route RP, a position of the dump truck 2 derived by the dead reckoning navigation is corrected by a GPS position detected by the GPS receiver 31 or an absolute position calculated by the scan matching navigation calculating unit 33B. In the following description, controlling travel of the dump truck 2 by using a GPS position, namely, detection data detected by the GPS receiver 31 will be suitably referred to as GPS travel, and controlling travel of a dump truck 2 by using an absolute position calculated by the scan matching navigation calculating unit 33B will be suitably referred to as scan matching navigation travel.

The dump truck 2 includes: the GPS receiver 31 functioning as a position detecting device to detect a GPS position of the dump truck 2; and the laser sensor 24B functioning as a non-contact sensor to detect, in a non-contact manner, the travel route RP on which the dump truck 2 travels and a bank BK that is an object beside the travel route RP. The map data generating unit 33C generates map data MI of the travel route RP in the mine including a bank BK on the basis of detection data obtained by the GPS detector 31 and detection data obtained by the laser sensor 24B. The map data MI generated by the map data generating unit 33C is stored in the map storage database 36. The map data generating processing is performed when an error of a GPS position of the dump truck 2 detected by the GPS receiver 31 is the predetermined error or less.

When the scan matching navigation travel is performed, the map data MI stored in the map storage database 36 is read into the storage unit 33D having an operation speed higher than that of the map storage database 36. The scan matching navigation calculating unit 33B matches the map data MI read into the storage unit 33D from the map storage database 36 with the detection data obtained by the laser sensor 24B, and calculates a position of the dump truck 2. The travel controller 20 functioning as a travel control unit makes the dump truck 2 travel on the basis of the position of the dump truck 2 calculated by the scan matching navigation calculating unit 33B and the travel route RP (course data) set by the processing device 12 and the travel route generating device 32.

In the scan matching navigation travel, in a case of attempting to cause the storage unit 33D to read all of pieces of map data MI accumulated in the map storage database 36, it is necessary to increase a capacity of the storage unit (RAM) 33D. In the scan matching navigation travel of the dump truck 2, only a piece of map data MI around the traveling dump truck 2 is to be matched with detection data DR2 actually detected by the laser sensor 24B out of the pieces of map data MI stored in the map storage database 36. When all of the pieces of the map data MI stored in the map storage database 36 are read into the storage unit 33D, a load to be subjected to calculation processing (extraction processing) is increased at the time of extracting only the piece of map data MI around the traveling dump truck 2.

In the first embodiment, a management map data MIm indicating a predetermined area (management area) of the mine generated by the map data generating unit 33C is divided into a plurality of divided map data pieces MIp. The predetermined area (management area) is an area where the dump truck 2 operates. A divided map data piece MIp indicates each of the plurality of divided areas set by dividing the management area of the mine. The plurality of divided map data pieces MIp is stored in the map storage database 36 provided as a first storage unit. In the scan matching navigation travel, the update unit 33E determines specific map data MIf from among the plurality of divided map data pieces MIp stored in the map storage database 36 on the basis of positional data acquired by the positional data acquisition unit 33F and indicating an absolute position of the dump truck 2, and causes the storage unit 33D provided as a second storage unit to read the determined specific map data MIf. The scan matching navigation calculating unit 33B matches the specific map data MIf read into the storage unit 33D with detection data obtained by the laser sensor 24B, and calculates an absolute position of the dump truck 2. The travel controller 20 controls travel of the dump truck 2 on the basis of the absolute position of the dump truck 2 calculated by the scan matching navigation calculating unit 33B such that the dump truck 2 travels in accordance with the set course data.

Figure 9:
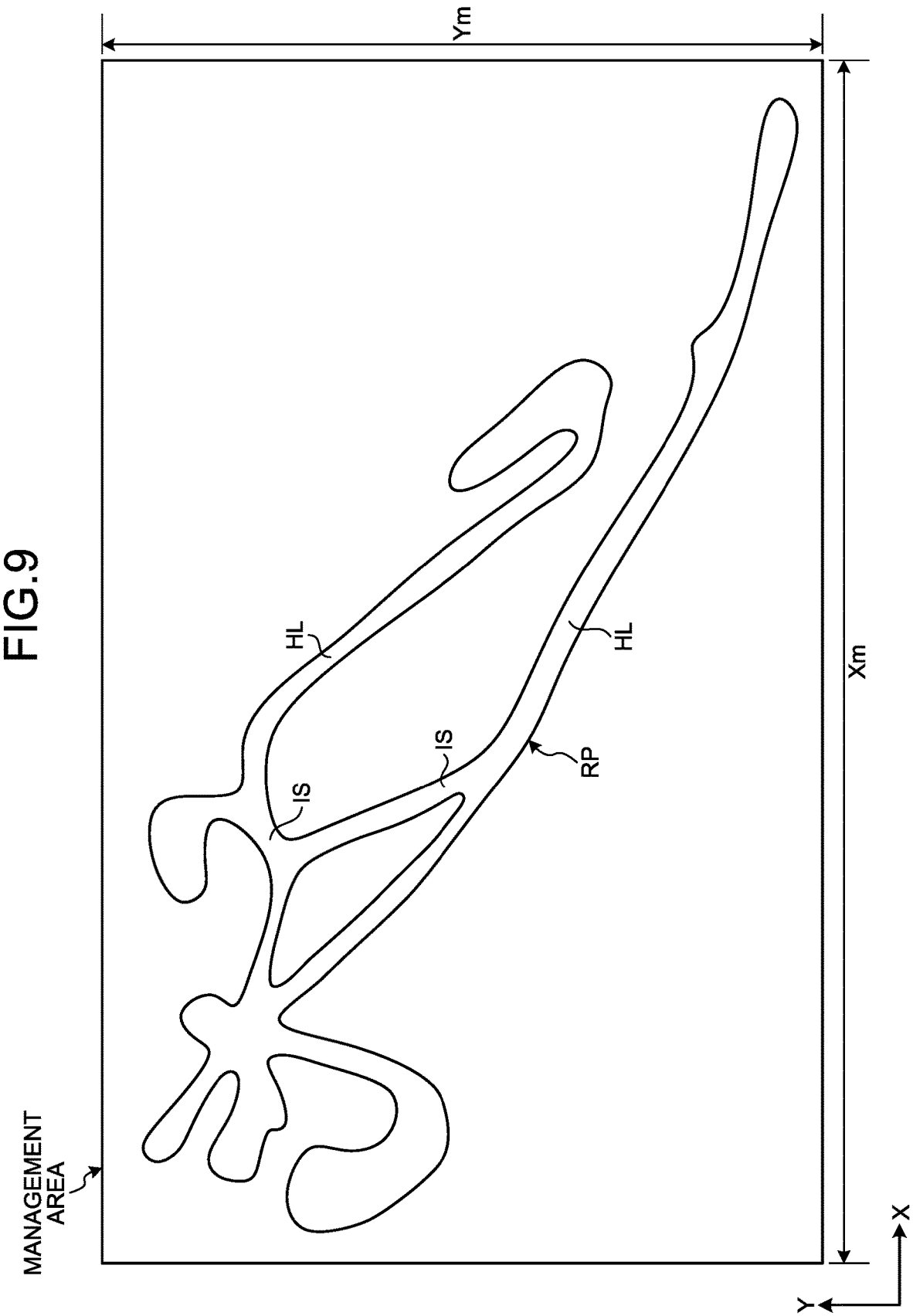
FIG. 9 is a diagram illustrating an exemplary management area according to the first embodiment.

FIG. 9 is a diagram illustrating an exemplary management area. The management area is a predetermined area in the mine. As illustrated in FIG. 9, a travel route RP including a plurality of hauling paths HL and a plurality of intersections IS are set in the management area. An outline of the management area is substantially rectangular.

Figure 10:
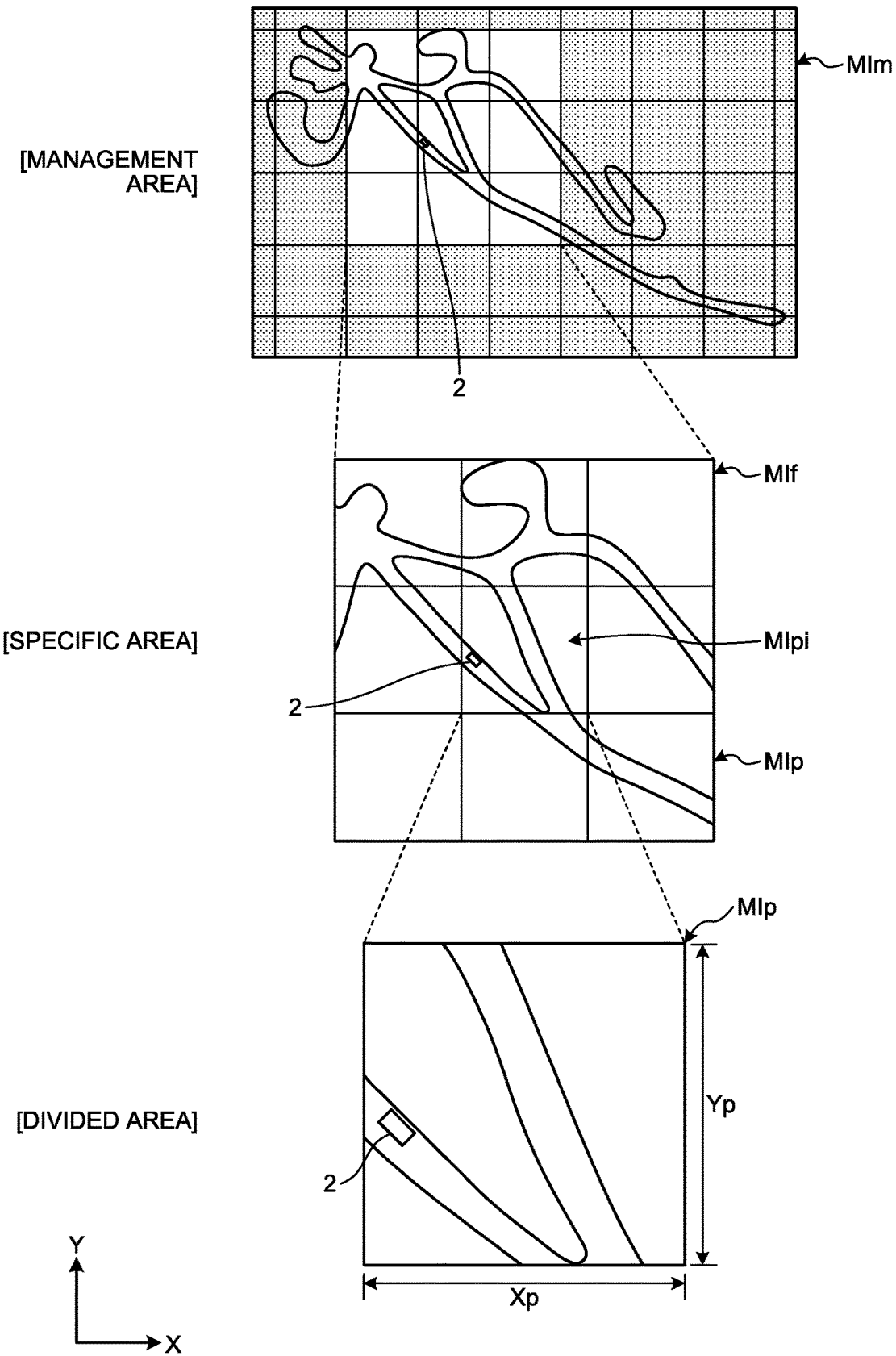
FIG. 10 is a diagram illustrating examples of management map data MIm, divided map data pieces MIp, and specific map data MIf according to the first embodiment.

FIG. 10 is a diagram illustrating examples of management map data MIm, divided map data pieces MIp, and specific map data MIf. As illustrated in FIG. 10, the management map data MIm indicating the management area is divided into a plurality of divided map data pieces MIp. A shape of each divided area is substantially square.

Specific map data MIf is determined on the basis of positional data indicating an absolute position of the dump truck 2 acquired by the positional data acquisition unit 33F. The absolute position of the dump truck 2 is detected by the GPS detector 31. Additionally, the absolute position of the dump truck 2 is calculated by the scan matching navigation calculating unit 33B. The positional data acquisition unit 33F acquires the positional data of the dump truck 2 from at least one of the GPS detector 31 and the scan matching navigation calculating unit 33B.

A specific map indicated by the specific map data MIf is determined so as to include a current position (absolute position) of the dump truck 2. In the example illustrated in FIG. 10, the specific map data MIf is an aggregate of nine divided map data pieces MIp. The specific map data MIf includes: a divided map data piece MIpi indicating a divided area where dump truck 2 exists; and divided map data pieces respectively indicating a plurality of (eight) divided areas arranged around the divided area where the dump truck 2 exists.

A divided map data piece MIp is defined by a plurality of grids GR. An absolute position of each of the plurality of grids GR is defined. In the global coordinate system, coordinate data of each of the plurality of grids GR in the XY coordinate system is known data. Identification data (ID) is assigned to each of the plurality of grids GR. Additionally, identification data (ID) is also assigned to each of the plurality of divided areas. For the sake of convenience, illustration of the grids GR is omitted in FIG. 10.

Figure 11:
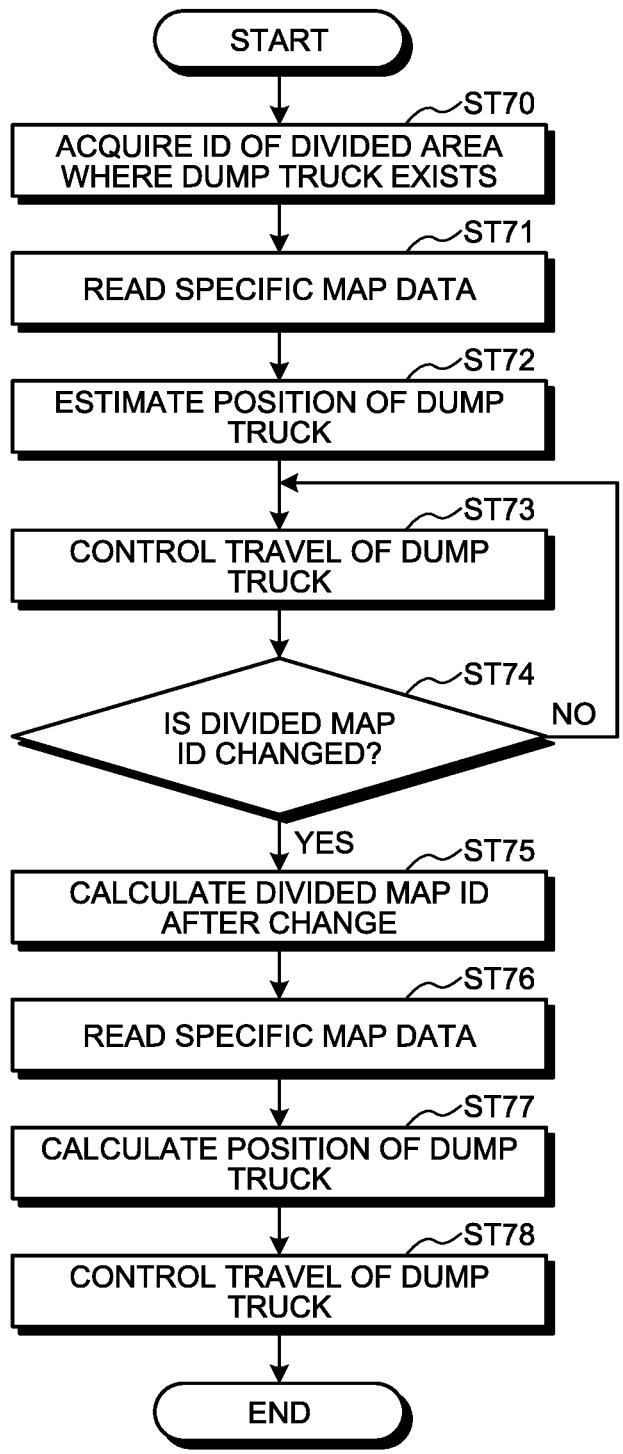
FIG. 11 is a flowchart illustrating exemplary operation of a dump truck 2 in SMN travel.

Next, exemplary operation of the dump truck 2 in the scan matching navigation travel will be described. FIG. 11 is a flowchart illustrating exemplary operation of the dump truck 2 in the scan matching navigation travel.

In the map storage database 36, map data MI generated in the map data generating processing is stored. The map data MI stored in the map storage database 36 includes: management map data MIm generated by the map data generating unit 33C on the basis of detection data obtained by the GPS detector 31 and detection data obtained by the laser sensor 24B; and divided map data pieces MIp set by dividing the management map data MIm.

Positional data indicating a current absolute position of the dump truck 2 traveling on the travel route RP is detected by the GPS receiver 31 or the scan matching navigation calculating unit 33B. The update unit 33E of the position measurement controller 33 pinpoints a current position of the dump truck 2 and a grid GR corresponding to the current position of the dump truck 2 on the basis of positional data of the dump truck 2 acquired by the positional data acquisition unit 33F. The update unit 33E acquires an ID of the grid GR indicating the current position of the dump truck 2 and an ID of the divided area including the grid ID (step ST70).

The update unit 33E determines the specific map data MIf from among the plurality of divided map data pieces MIp stored in the map storage database 36 on the basis of the ID of the divided area pinpointed from the detection data obtained by the GPS detector 31, and causes the storage unit 33D to read the specific map data MIf (step ST71). As described above, in the first embodiment, the specific map data MIf includes: a divided map data piece MIpi indicating a divided area where the dump truck 2 exists; and divided map data pieces MIp respectively indicating a plurality of divided areas arranged around the divided area where the dump truck 2 exists. The nine divided map data pieces MIp indicating respective nine adjacent divided areas are read into the storage unit 33D as the specific map data MIf.

The scan matching navigation calculating unit 33B matches the specific map data MIf read into the storage unit 33D with detection data obtained by the laser sensor 24, and calculates an absolute position of the dump truck 2 (step ST72). The travel controller 20 controls travel of the dump truck 2 on the basis of the absolute position of the dump truck 2 calculated by the scan matching navigation calculating unit 33B such that the dump truck 2 travels in accordance with the course data set by the processing device 12 (Step ST73).

With travel of the dump truck 2, a current position of the dump truck 2 is changed, and a grid GR indicating the current position of the dump truck 2 and a divided area including the grid GR are changed after performing a step of estimating the position of the own vehicle by the scan matching navigation or dead reckoning navigation. The update unit 33E determines, on the basis of positional data indicating a current absolute position of the dump truck 2 acquired by the positional data acquisition unit 33F, whether the divided area where the current position of the dump truck 2 belongs to is changed, in other words, whether a divided map ID where the dump truck 2 exists is changed (step ST74).

In the case where it is determined in step ST74 that the divided map ID is not changed (step ST74: No), controlling travel of the dump truck 2 is continued.

In the case where it is determined in step ST74 that the divided map ID is changed (step ST74: Yes), the update unit 33E calculates a divided map ID after the change (step ST75).

The update unit 33E determines specific map data MIf from among the plurality of divided map data pieces MIp stored in the map storage database 36 on the basis of the calculated divided area ID, and causes the storage unit 33D to read the determined specific map data MIf (Step ST76).

Similar to step ST71, the specific map data MIf includes: a divided map data piece MIpi indicating a divided area where the dump truck 2 exists; and divided map data pieces MIp respectively indicating a plurality of divided areas arranged around the divided area where the dump truck 2 exists. The nine divided map data pieces MIp indicating respective nine adjacent divided areas are read into the storage unit 33D as the specific map data MIf.

The scan matching navigation calculating unit 33B matches the specific map data MIf read into the storage unit 33D with detection data obtained by the laser sensor 24, and calculates an absolute position of the dump truck 2 (step ST77). The travel controller 20 controls travel of the dump truck 2 on the basis of the absolute position of the dump truck 2 calculated by the scan matching navigation calculating unit 33B such that the dump truck 2 travels in accordance with the course data set by the processing device 12 (Step ST78).

After that, the above-described processing is repeated.

Figure 12:
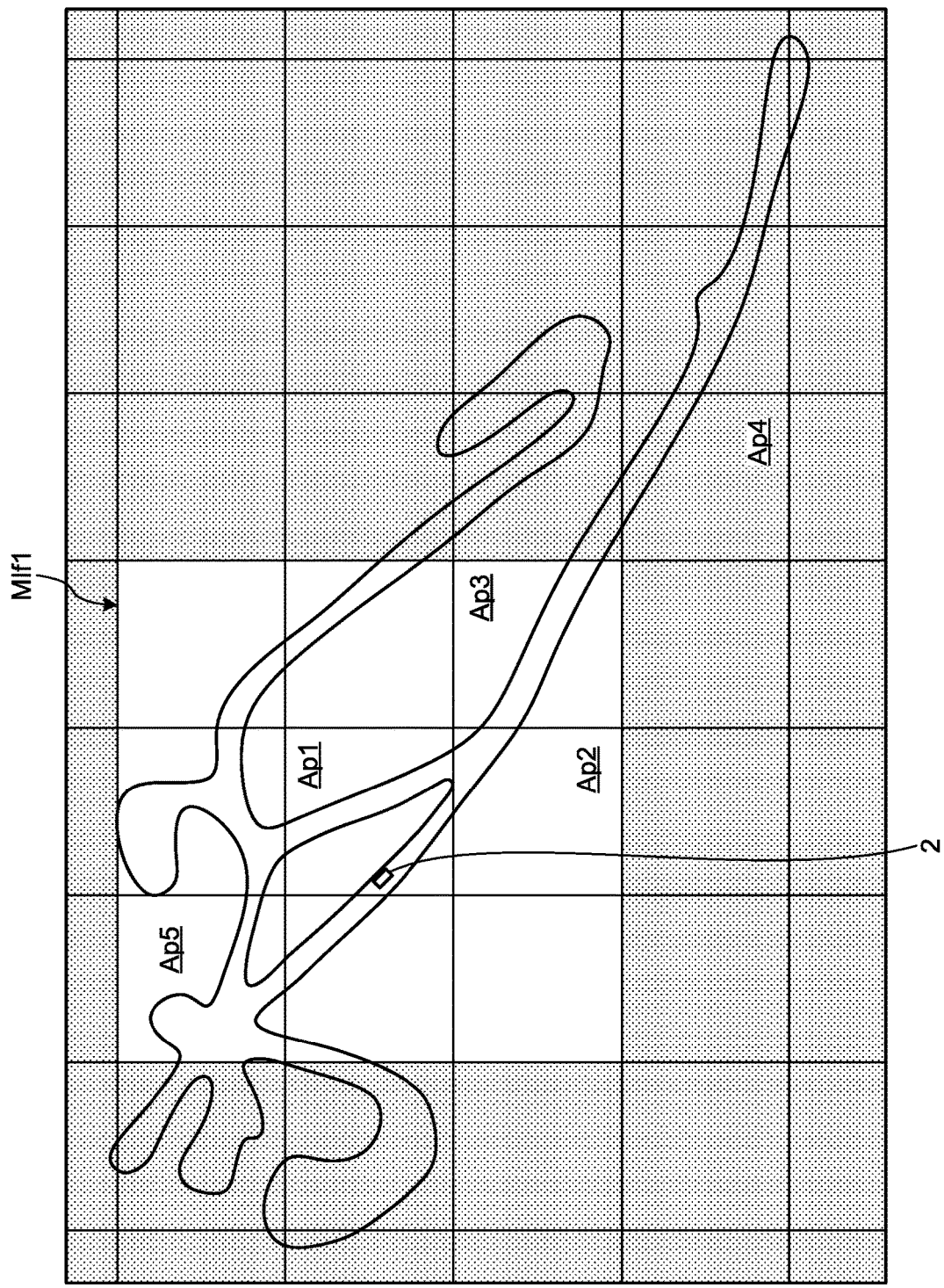
FIG. 12 is a schematic diagram illustrating a state in which specific map data to be read into the storage unit is changed due to movement of the dump truck.
Figure 13:
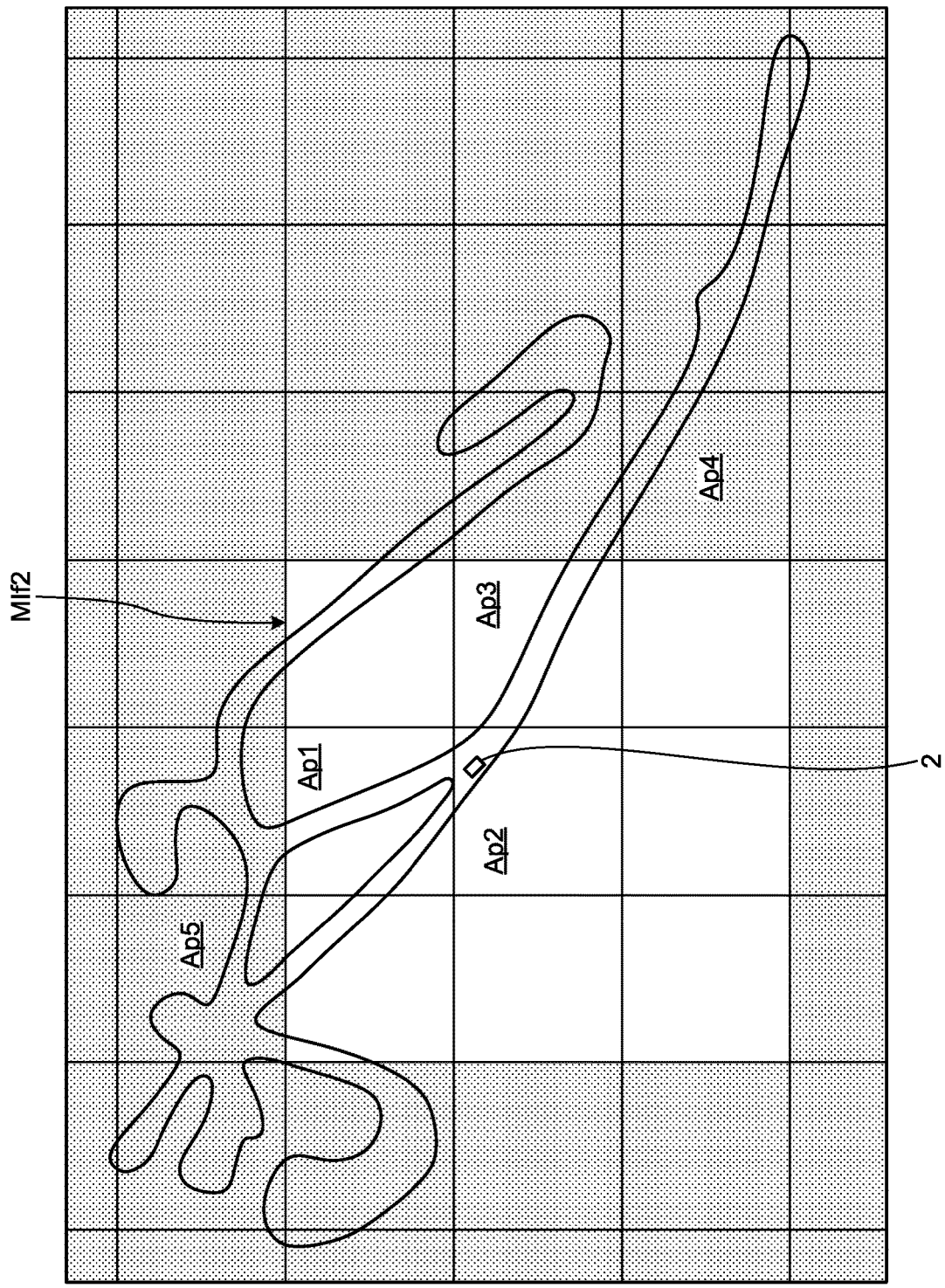
FIG. 13 is a schematic diagram illustrating a state in which specific map data to be read into the storage unit is changed due to movement of the dump truck.
Figure 14:
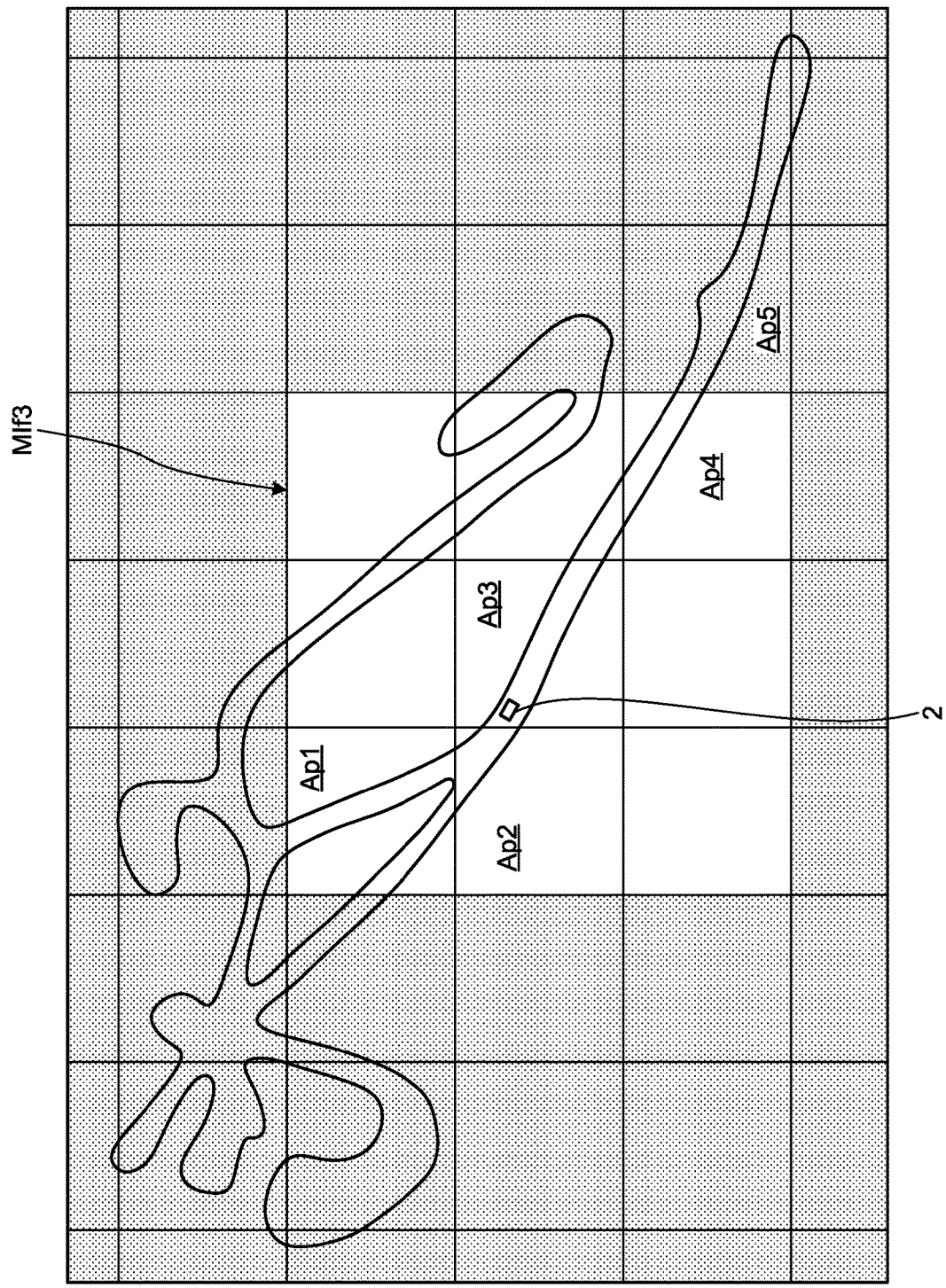
FIG. 14 is a schematic diagram illustrating a state in which specific map data to be read into the storage unit is changed due to movement of the dump truck.

FIGS. 12, 13, and 14 are schematic diagrams illustrating states in which specific map data MIf to be read into the storage unit 33D is changed due to movement of the dump truck 2. FIGS. 12, 13, and 14 illustrate the states in which the dump truck 2 is moved from a divided area Ap1 to a divided area Ap3 via a divided area Ap2. The divided area Ap1 is adjacent to the divided area Ap2. The divided area Ap2 is adjacent to the divided area Ap3. The divided area Ap3 is adjacent to the divided area Ap2 in an advancing direction of the dump truck 2 being moved from the divided area Ap1 to the divided area Ap2. The update unit 33E can pinpoint a divided area Ap where the dump truck 2 exists on the basis of detection data obtained by the GPS detector 31.

In the state illustrated in FIG. 12, in other words, in the state in which the dump truck 2 exists in the divided area Ap1, specific map data MIf1 to be read into the storage unit 33D includes: a divided map data piece MIp indicating the divided area Ap1; and a divided map data piece MIp indicating each of a plurality of divided areas Ap adjacent to the divided area Ap1 and arranged around the divided area Ap1. In the state where the dump truck 2 exists in the divided area Ap1, the specific map data MIf1 to be read into the storage unit 33D includes the nine divided map data pieces MIp.

In the state illustrated in FIG. 13, in other words, in the state in which the dump truck 2 exists in the divided area Ap2, specific map data MIf2 to be read into the storage unit 33D includes: a divided map data piece MIp indicating the divided area Ap2; and divided map data pieces MIp respectively indicating a plurality of divided areas Ap adjacent to the divided area Ap2 and arranged around the divided area Ap2. In the state where the dump truck 2 exists in the divided area Ap2, the specific map data MIf2 to be read into the storage unit 33D includes the nine divided map data pieces MIp.

In the state illustrated in FIG. 14, in other words, in the state in which the dump truck 2 exists in the divided area Ap3, specific map data MIf3 to be read into the storage unit 33D includes: a divided map data piece MIp indicating the divided area Ap3; and divided map data pieces MIp respectively indicating a plurality of divided areas Ap adjacent to the divided area Ap3 and arranged around the divided area Ap3. In the state where the dump truck 2 exists in the divided area Ap3, the specific map data MIf3 to be read into the storage unit 33D includes the nine divided map data pieces MIp.

As illustrated in FIGS. 12, 13, and 14, the specific map data MIf1 to be read into the storage unit 33D in the state in which the dump truck 2 exists in the divided area Ap1, the specific map data MIf2 to be read into the storage unit 33D in the state in which the dump truck 2 exists in the divided area Ap2, and the specific map data MIf3 to be read into the storage unit 33D in the state in which the dump truck 2 exists in the divided area Ap3 are different. Thus, the update unit 33E changes the specific map data MIf to be read into the storage unit 33D on the basis of detection data obtained by the GPS detector 31.

When the update unit 33E determines that the dump truck 2 is moved from the divided area Ap1 to the divided area Ap2 on the basis of positional data of the dump truck 2 acquired by the positional data acquisition unit 33F, the update unit 33E causes the storage unit 33D to read the specific map data MIf2, and changes the specific map data MIf to be stored in the storage unit 33D from the specific map data MIf1 to the specific map data MIf2. Consequently, the specific map data MIf stored in the storage unit 33D is updated from the specific map data MIf1 to the specific map data MIf2.

Similarly, when the update unit 33E determines that the dump truck 2 is moved from the divided area Ap2 to the divided area Ap3 on the basis of positional data of the dump truck 2 acquired by the positional data acquisition unit 33F, the update unit 33E causes the storage unit 33D to read the specific map data MIf3 and changes the specific map data MIf to be stored in the storage unit 33D from the specific map data MIf2 to the specific map data MIf3. Consequently, the specific map data MIf stored in the storage unit 33D is updated from the specific map data MIf2 to the specific map data MIf3.

As illustrated in FIGS. 12, 13, and 14, as the dump truck 2 travels, a divided map data piece MIp indicating a divided area Ap located in an advancing direction (front side of the advancing direction) of the dump truck 2 is sequentially read into the storage unit 33D as specific map data MIf, and a divided map data piece MIp indicating a divided area Ap located in an opposite direction of the advancing direction (rear side of the advancing direction) of the dump truck 2 is sequentially erased from the storage unit 33D.

For example, when the dump truck 2 is moved from the divided area Ap1 to the divided area Ap3 via the divided area Ap2, in a state in which the dump truck 2 exists in the divided area Ap1 as illustrated in FIG. 12, a divided map data piece MIp indicating a divided area Ap4 located in the advancing direction of the dump truck 2 with respect to the divided area Ap3 is not yet read into the storage unit 33D and being stored in the map storage database 36. As illustrated in FIG. 13, when it is determined that the dump truck 2 is moved from the divided area Ap1 to the divided area Ap2 and then the dump truck 2 is moved from the divided area Ap1 to the divided area Ap3 via the divided area Ap2, the update unit 33E causes the storage unit 33D to read a divided map data piece MIp stored in the map storage database 36 and indicating the divided area Ap4.

Furthermore, as illustrated in FIGS. 13 and 14, when it is determined that the dump truck 2 is moved from the divided area Ap2 to the divided area Ap3 and then the dump truck 2 is moved from the divided area Ap2 to the divided area Ap4 via the divided area Ap3, the update unit 33E causes the storage unit 33D to read a divided map data piece MIp stored in the map storage database 36 and indicating a divided area Ap5 located in the advancing direction of the dump truck 2 with respect to the divided area Ap4.

Additionally, as illustrated in FIGS. 13 and 14, when it is determined that the dump truck 2 is moved from the divided area Ap1 to the divided area Ap2, the update unit 33E erases, from the storage unit 33D, the divided map data piece MIp stored in the storage unit 33D and indicating the divided area Ap5 located in the opposite direction of the advancing direction of the dump truck 2 with respect to the divided area Ap1.

As illustrated in FIGS. 12, 13, and 14, contents in the specific map data MIf1, contents in the specific map data MIf2, and contents in the specific map data MIf3 are different. On the other hand, each of the specific map data MIf1, specific map data MIf2, and specific map data MIf3 includes data amounts of nine divided map data pieces MIp. In other words, the data amount of the specific map data MIf1, data amount of the specific map data MIf2, and data amount of the specific map data MIf3 are equal. In the first embodiment, the update unit 33E performs: processing to cause the storage unit 33D to read at least part of the divided map data pieces MIp stored in the map storage database 36; and processing to erase at least part of the divided map data pieces MIp stored in the storage unit 33D in accordance with position change of the dump truck 2, such that the data amount of specific map data MIf stored in the storage unit 33D is kept at a constant value even though the dump truck 2 is moved around plurality of divided areas Ap.

Figure 15:
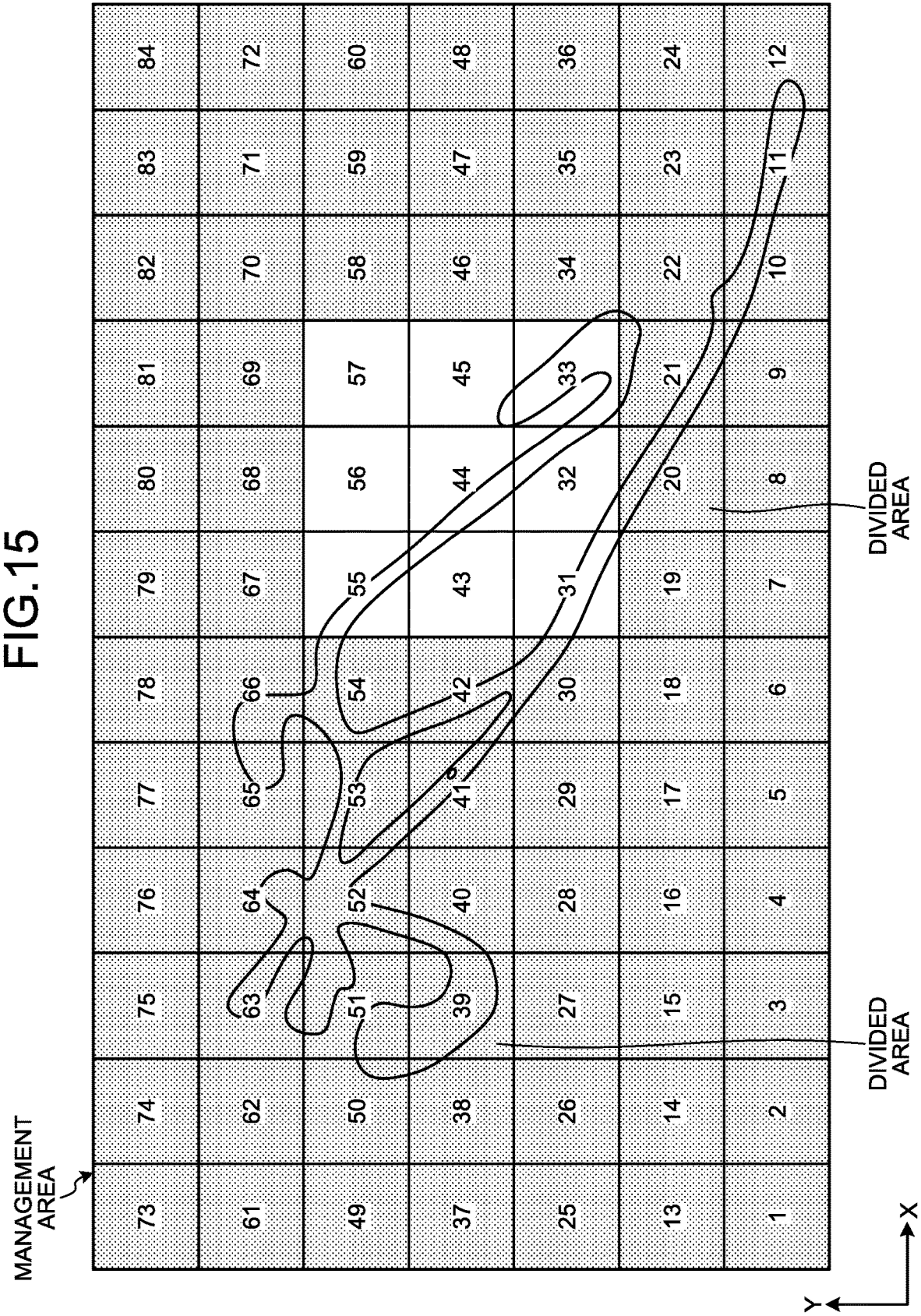
FIG. 15 is a diagram schematically illustrating a plurality of divided areas dividing a management area.
Figure 16:
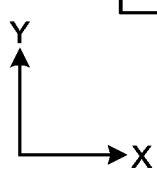
FIG. 16 is a schematic diagram to describe a calculation method for a divided map ID after change.

Next, an exemplary calculation method (processing in step ST75) for a divided map ID after the divided map ID is changed due to movement of the dump truck 2 will be described with reference to FIGS. 15 and 16. FIG. 15 is a diagram schematically illustrating a plurality of divided areas dividing the management area. FIG. 16 is a schematic diagram to describe the calculation method for a divided map ID after change.

As illustrated in FIG. 15, the management area is divided into a plurality of divided areas. As for divided areas that divide the management area, the divided areas corresponding to first number of divisions are arranged in an X-axis direction and the divided areas corresponding to second number of divisions are arranged in a Y-axis direction. In the example illustrated in FIG. 15, the management area includes a plurality of divided maps, and twelve thereof are arranged in the X-axis direction within an XY plane and seven thereof are arranged in the Y-axis direction orthogonal to the X-axis direction within the XY plane. In other words, the management area is divided into a plurality of divided areas "1" to "84". Each of divided areas is assigned with a number in ascending order in the X-axis direction in increments of one.

The update unit 33E constantly calculates an ID of a divided area where the dump truck 2 exists, and in a case of determining that an ID of a divided area is changed to an ID of an adjacent divided area, the update unit 33E acquires the ID of the divided area after the change.

In the XY coordinate system, an ID of a divided area at a certain coordinate value (x, y) can be calculated only by four arithmetic operations as illustrated in Expressions (1), (2) and (3). Expression (1) is an expression to calculate an index in the X-axis direction. Expression (2) is an expression to calculate an index in the Y-axis direction. Expression (3) is an expression to calculate an index of a data matrix.

$$\text{ind}X = (\text{int})(x-cx)/Re + w/2.0 \qquad (1)$$

$$\text{ind}Y = (\text{int})(y-cy)/Re + h/2.0 \qquad (2)$$

$$\text{ind} = w \times \text{ind}Y + \text{ind}X \qquad (3)$$

In Expressions (1), (2) and (3), cx and cy represent center coordinates of a divided area in the global coordinate system. Re represents a resolution of a divided map data piece. w represents the first number of divisions in the X-axis direction by the divided areas in the management area. h indicates the second number of divisions in the Y-axis direction by the divided areas in the management area.

As illustrated in FIG. 16, in a case where nine divided areas are adjacent to each other centering a divided area having coordinate data (or ID) set to "i" and the dump truck 2 exists in this central divided area, coordinate data in each of eight divided areas adjacent to the central divided area can be calculated at a high speed only by the four arithmetic operations using the first number of divisions w. As illustrated in FIG. 16, a coordinate value of a divided area adjacent on an +X side of the central divided area is "i+1", a coordinate value of a divided area adjacent on an −X side of the same is "i−1", a coordinate value of a divided area adjacent on a +Y side of the same is "i+w", and a coordinate value of a divided area adjacent on a −Y side of the same is "i−w". Additionally, a coordinate value of a divided area adjacent on the +X side of the divided area having the coordinate value of "i+w" is "i+w+1", and a coordinate value of a divided area adjacent on the −X side of the same is "i+w−1". Furthermore, a coordinate value of a divided area adjacent on the +X side of the divided area having an ID of "i−w" is "i−w+1", and a coordinate value of a divided area adjacent to the −X side of the same is "i−w−1". Thus, the update unit 33E can determine, on the basis of the coordinate value "i" and the first number of divisions w of the divided area where the dump truck 2 exists, specific map data MIf to be read into the storage unit 33D after a coordinate value of a divided map and an ID assigned in a manner correlated to the coordinate value are changed.

Meanwhile, in the examples illustrated in FIG. 15 and FIG. 16, an example of assigning each divided area with coordinate data (or ID) by numbering the divided areas in the ascending order in the X-axis direction in increments of one. Since each of the divided areas is assigned with coordinate data (or ID) by numbering the divided areas in the ascending order in the Y-axis direction in increments of one, the update unit 33D can determine specific map data MIf to be read into the storage unit 33D on the basis of coordinate data of a divided area where the dump truck 2 exists within the XY plane and the second number of divisions h.

Functions and Effects

As described above, according to the first embodiment, a management area is divided into a plurality of divided maps, a plurality of divided map data pieces MIp indicating respective maps of the plurality of divided areas are stored in the map storage database 36, and specific map data MIf is determined from among the plurality of divided map data pieces MIp stored in the map storage database 36 on the basis of positional data indicating an absolute value of a dump truck 1 and acquired by the positional data acquisition unit 33F, and therefore, only the specific map data MIf indicating a map around the dump truck 2 necessary for the scan matching navigation can be read into the storage unit 33D from among the plurality of divided map data pieces MIp stored in the map storage database 36. Consequently, the scan matching navigation travel can be performed by calculating a position of the dump truck 2 by using the specific map data MIf read into the storage unit 33D without increasing the capacity of the storage unit 33D and a load of the calculation processing.

Additionally, according to the first embodiment, the update unit 33E changes specific map data MIf to be read into the storage unit 33D on the basis of detection data obtained by the GPS detector 31, and therefore, even when the dump truck 2 travels on the travel route RP, only specific map data MIf around the dump truck 2 necessary for the scan matching navigation travel can be constantly read into the storage unit 33D, and data unnecessary for the scan matching navigation travel is prevented from being read into the storage unit 33D.

Furthermore, according to the first embodiment, specific map data MIf to be read into the storage unit 33D includes a plurality of divided map data pieces MIp indicating adjacent divided areas. When it is determined that the dump truck 2 is moved from one divided area to the other divided area within two adjacent divided areas, the update unit 33E updates the specific map data MIf on the basis of detection data obtained by the GPS receiver 31. Since update timing for the specific map data MIf is defined at the timing when the dump truck 2 is moved from one divided area to the other divided area, only the specific map data MIf minimum necessary for the scan matching navigation travel can be constantly used.

Moreover, according to the first embodiment, in a case where the dump truck 2 is moved from a divided area Ap1 to a divided area Ap3 via a divided area Ap2, the update unit 33E causes the storage unit 33D to sequentially read, as specific map data MIf, a divided map data piece MIp indicating a divided area Ap on a front side of an advancing direction of the dump truck 2, and therefore, specific map data MIf necessary for the scan matching navigation travel can be stored in the storage unit 33D.

Additionally, according to the first embodiment, the update unit 33E sequentially erases, from the storage unit 33D, a divided map data piece MIp indicating a divided area Ap located on a rear side of the advancing direction of the dump truck 2, and therefore, a data amount to be stored in the storage unit 33D can be suppressed from being increased.

Furthermore, according to the first embodiment, specific map data MIf includes: a divided map data piece MIp indicating a divided area where the dump truck 2 exists; and divided map data pieces MIp respectively indicating a plurality of divided areas arranged around the divided area where the dump truck 2 exists. Consequently, specific map data MIf necessary and sufficient for the scan matching navigation travel is stored in the storage unit 33D.

Furthermore, according to the first embodiment, the update unit 33D performs: processing to cause the storage unit 33D to read at least part of the divided map data pieces MIp stored in the map storage database 36; and processing to erase at least part of the divided map data pieces MIp stored in the storage unit 33D, such that the data amount of specific map data MIf stored in the storage unit 33D is kept at a constant value Consequently, specific map data MIf necessary and sufficient for the scan matching navigation travel can be stored in the storage unit 33D while the data amount to be stored in the storage unit 33D is suppressed.

Furthermore, according to the first embodiment, the update unit 33E calculates and determines specific map data MIf to be read into the storage unit 33D at a high speed on the basis of at least one of a coordinate value of a divided area where the dump truck 2 exists, the first number of divisions number w, and the second number of divisions h.

Second Embodiment

A second embodiment will be described. In the following description, a constituent element same or equivalent to that of an above-described first embodiment will be denoted by a same reference sign, and a description therefor will be simplified or omitted.

In the above-described first embodiment, described is a method of suppressing: increase in a capacity of a storage unit 33D provided as a second storage unit; and increase in a data amount. In the second embodiment, a description will be given for a method of suppressing: increase in a data amount of the map storage database 36 provided as a first storage unit; and increase in a capacity.

Dump Truck Operation in Generating Map Data

Figure 17:
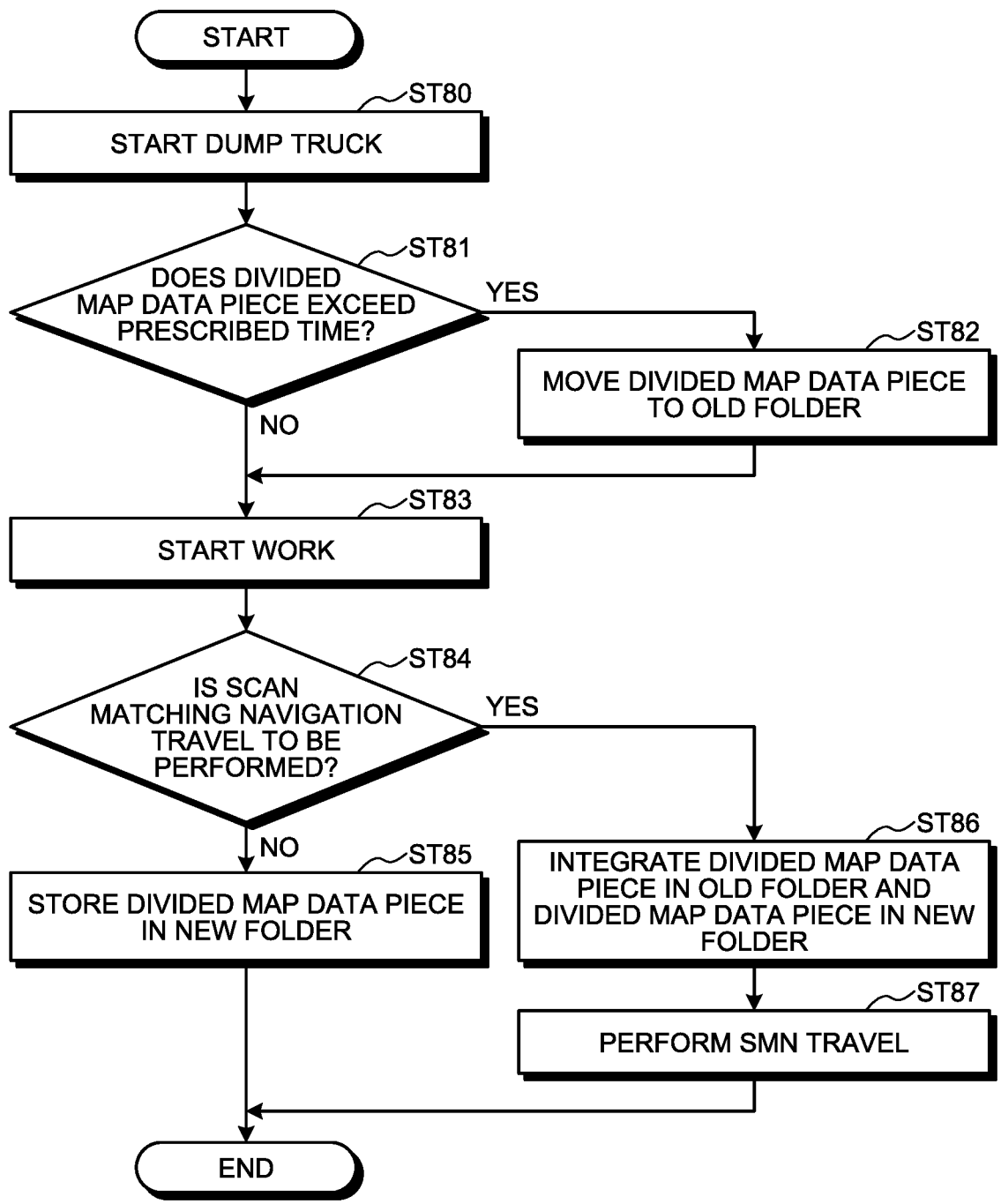
FIG. 17 is a flowchart illustrating operation of a dump truck at the time of generating map data according to a second embodiment.
Figure 18:
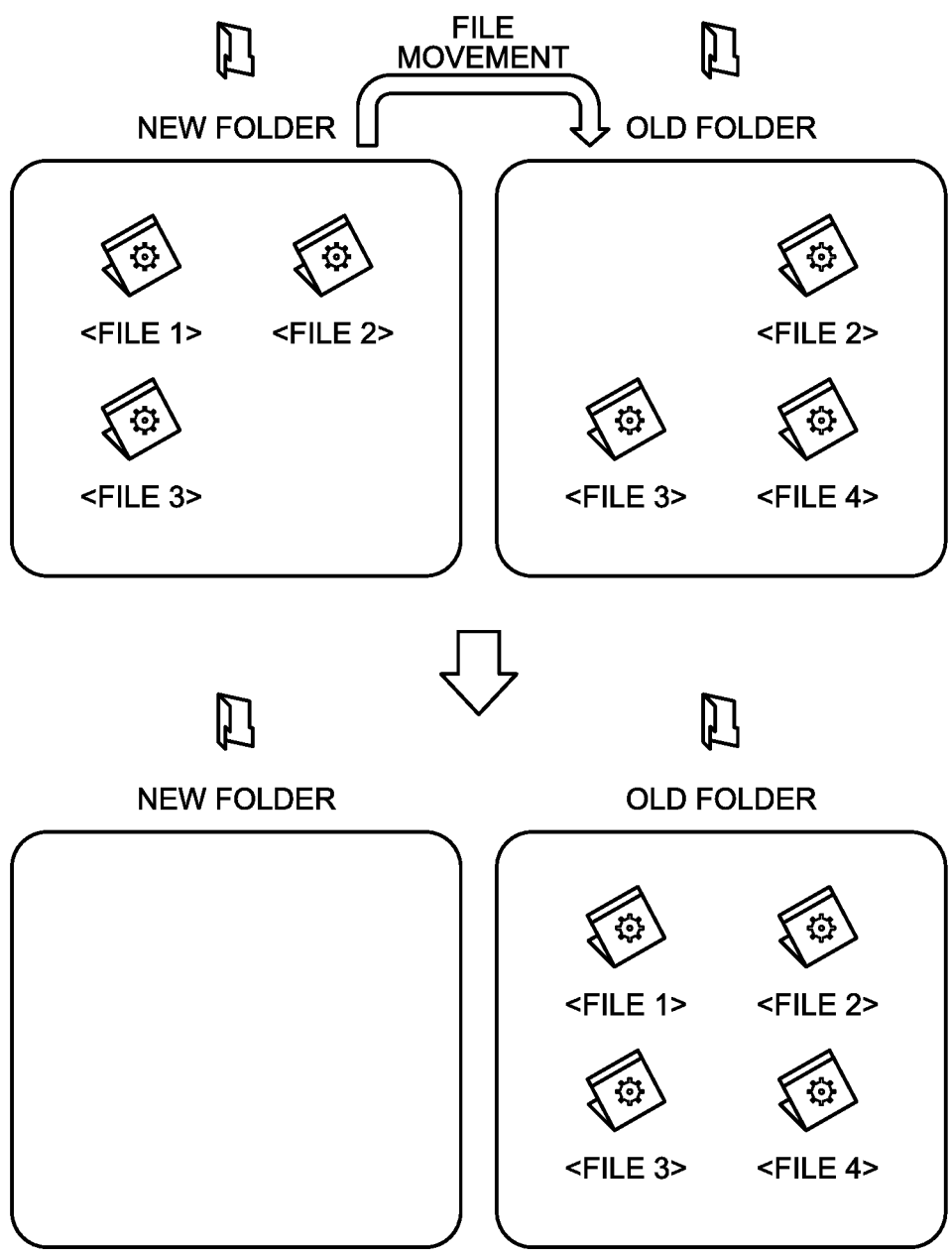
FIG. 18 is a schematic diagram to describe operation of a map storage database according to the second embodiment.

FIG. 17 is a flowchart illustrating operation of a dump truck 2 at the time of generating map data MI according to the second embodiment. FIG. 18 is a schematic diagram to describe operation of the map storage database 36 according to the second embodiment.

The map storage database 36 stores divided map data pieces MIp generated in map data generating processing during a past predetermined period. In other words, the divided map data pieces MIp generated on the basis of detection data obtained by a GPS detector 31 and detection data obtained by a laser sensor 24B acquired during the past predetermined period are stored in the map storage database 36.

The dump truck 2 that has been stopped in a parking lot is started (step ST80). When the dump truck 2 is started and a position measurement controller 33 is started up, an update unit 33E determines whether an elapsed time from when divided map data pieces MIp are generated during the past predetermined period and stored in the map storage database 36 exceeds a prescribed time (step ST81). A plurality of divided map data pieces MIp is stored in the map storage database 36. As for each of the plurality of divided map data pieces MIp, the update unit 33E determines whether the elapsed time from generating thereof exceeds the prescribed time. The prescribed time is, for example, three days.

In the map storage database 36, each of the plurality of divided map data pieces MIp is converted into a file, and managed in a folder. As illustrated in FIG. 18, the divided map data pieces MIp of which the elapsed time from generating thereof does not exceed the prescribed time are stored in a new folder. The divided map data pieces MIp of which the elapsed time from generating thereof exceeds the prescribed time are stored in an old folder.

In the example illustrated in FIG. 18, three divided map data pieces (file 1, file 2, and file 3) generated during a past predetermined period (second period) are stored in a new folder, and three divided map data pieces (file 2, file 3, and file 4) generated during a period (first period) before the past predetermined period (second period) are stored in an old folder.

The file 1 corresponds to a divided map data piece MIp indicating a first divided area out of a plurality of divided areas. The file 2 corresponds to a divided map data piece MIp indicating a second divided area out of the plurality of divided areas. The file 3 corresponds to a divided map data piece MIp indicating a third divided area out of the plurality of divided areas. The file 4 corresponds to a divided map data piece MIp indicating a fourth divided area out of the plurality of divided areas.

The file 2 stored in the new folder and the file 2 stored in the old folder are the divided map data pieces MIp indicating the same divided area (second divided area). The file 3 stored in the new folder and the file 3 stored in the old folder are the divided map data pieces MIp indicating the same divided area (third divided area).

In step ST81, as for each of the plurality of divided map data pieces MIp (file 1, file 2, file 3) generated during the past predetermined period and stored in the new folder, the update unit 33E determines whether an elapsed time from generating thereof exceeds the prescribed time. In a case of determining in step ST81 that there is a divided map data piece MIp of which an elapsed time from generating thereof exceeds a certain time (step ST81: Yes), the update unit 33E moves the divided map data pieces MIp stored in the new folder to the old folder (step ST82).

As illustrated in FIG. 18, all of the plurality of divided map data pieces MIp stored in the new folder, specifically, all of the file 1, file 2, and file 3 are moved from the new folder to the old folder. When the file 1, file 2, and file 3 stored in the new folder are moved to the old folder, the file 1 is stored in the old folder. A file 2 that has been stored in the old folder is updated (overwritten) with the folder 2 that has been just moved from the new folder to the old folder. A file 3 that has been stored in the old folder is updated (overwritten) with the folder 3 that has been just moved from the new folder to the old folder. A file 4 that has been stored in the old folder is continuously kept as it is.

Thus, at least a part of divided map folders MIp generated during the past first period and stored in the old folder of the map storage database 36 are updated with the divided map data pieces MIp generated during the second period after the first period.

In a case of determining in step ST81 that there is no divided map data piece MIp of which an elapsed time from generating thereof exceeds the certain time (step ST81: No) or in a case where the processing of step ST82 is finished, the dump truck 2 starts work in a mine (step ST83). The dump truck 2 travels on a travel route RP.

When the dump truck 2 travels, a position measurement controller 33 detects a bank BK with a laser sensor 24B while acquiring positional data of the dump truck 2 from a positional data acquisition unit 33F. A map data generating unit 33C of the position measurement controller 33 generates a divided map data piece MIp on the basis of detection data obtained by a GPS receiver 31 and detection data obtained by the laser sensor 24B. The generated divided map data piece MIp is stored in a new folder of the map storage database 36.

A travel controller 20 determines whether to perform scan matching navigation travel (step ST84).

In the case of determining in step ST84 not to perform the scan matching navigation travel but to perform GPS travel (step ST84: No), map data generating processing is continued. The update unit 33E stores, in a new folder, the divided map data piece MIp generated by using the laser sensor 24B (step ST85).

In a case where it is determined in step ST84 that the GPS travel is impossible and the scan matching navigation travel is to be performed (step ST84: Yes), the update unit 33E integrates the divided map data piece MIp stored in the old folder with a divided map data piece MIp stored in the new folder (step ST86). The divided map data piece stored in the new folder includes a divided map data piece MIp being generated in real time by using the laser sensor 24B.

As described with reference to FIG. 18, in a case where a file stored in the old folder and a file stored in the new folder are divided map data pieces indicating the same divided area, integrating the divided map data piece MIp stored in the old folder with the divided map data piece MIp stored in the new folder includes: updating (overwriting) the file in the old folder with the file of the new folder; and keeping a file that exists in only any one of the new folder and the old folder, without erasing and updating the file.

Additionally, integrating the divided map data piece MIp stored in the old folder with the divided map data piece MIp stored in the new folder includes calculating a logical sum of: a divided map data piece MIp generated for a certain divided area during the past first period and stored in the old folder; and the divided map data piece MIp generated for the same divided area during the second period after the first period.

Figure 19:
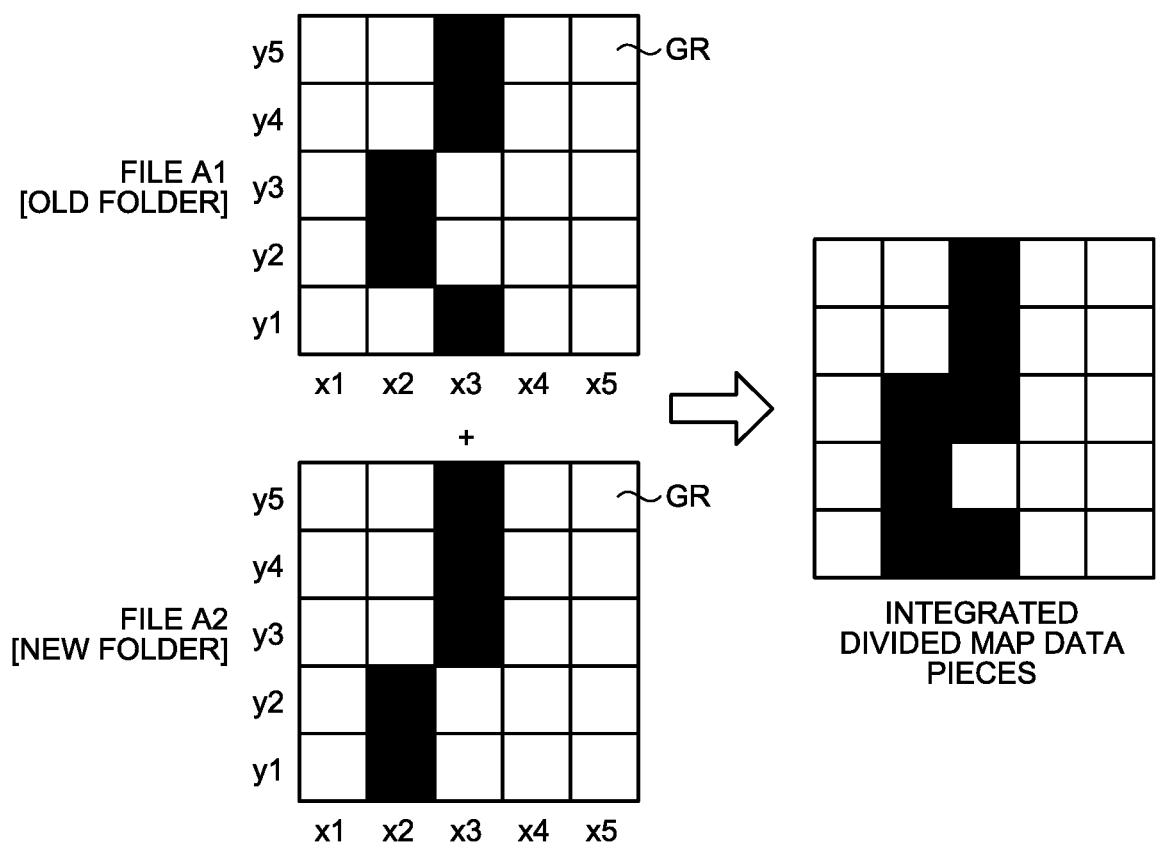
FIG. 19 is a schematic diagram to describe processing to calculate a logical sum of divided map data pieces MIp according to the second embodiment.

FIG. 19 is a schematic diagram to describe processing to calculate a logical sum of divided map data pieces MIp. A file A1 that is a divided map data piece generated during the past first period for a certain divided area Apa is stored in an old folder. A file A2 that is a divided map data piece generated during the second period after the first period for the same divided area Apa is stored in a new folder.

Each of the file A1 and the file A2 is defined by a plurality of grids GR. A coordinate value at X-Y coordinates is assigned to each of the plurality of grids GR. A coordinate value of a grid GR indicates an absolute position in a global coordinate system. The file A1 and the file A2 correspond to divided map data pieces in the same divided area Apa. Therefore, for example, a coordinate value (x1, y1) of the file A1 and a coordinate value (x1, y1) of the file A2 indicate the same position. Additionally, data included in each of the coordinate values of the file A1 and the file A2 is binary data (1 bit data) indicating existence of a bank BK.

As an example, the file A1 includes pieces of binary data indicating that a bank BK exists in coordinate values (x3, y1), (x2, y2), (x2, y3), (x3, y4), and (x3, y5). The file A2 includes pieces of binary data indicating that a bank BK exists in coordinate values (x2, y1), (x2, y2), (x3, y3), (x3, y4), and (x3, y5).

A logical sum of the file A1 and the file A2 is a logical sum of coordinate values indicating the same position. Therefore, as illustrated in FIG. 19, the integrated divided map data pieces indicating the logical sum of the file A1 and the file A2 includes the pieces of binary data indicating that the bank BK exists at the coordinate values (x2, y1), (x3, y1), (x2, y2), (x2, y3), (x3, y3), (x3, y4), and (x3, y5).

After the integrated divided map data pieces indicating the logical sum of the file A1 and the file A2 are generated, a position calculating unit 33B matches the integrated divided map data pieces (logical sum) with detection data obtained by the laser sensor 24B to calculate a position of the dump truck 2 in the divided area Apa. The travel controller 20 makes the dump truck 2 perform the scan matching navigation travel on the basis of the position of the dump truck 2 calculated by the position calculating unit 33B and the set course data (step ST87).

Functions and Effects

As described above, according to the second embodiment, as for a divided map data piece MIp stored in the map storage database 36, whether an elapsed time from generating thereof exceeds a prescribed time (e.g., three days) is determined, and generated divided map data pieces MIp are grouped per prescribed time and stored in one folder for management. Divided map data pieces MIp generated during a past first period (e.g., period from six days ago to three days ago while setting a present time as a reference) are stored in an old folder of the map storage database 36, and divided map data pieces MIp generated during a second period after the first period (e.g., period from three days ago to the present time while setting the present time as the reference) are stored in a new folder. The divided map data pieces MIp generated during the first period are updated with the divided map data pieces MIp generated during the second period. Consequently, the old divided map data pieces are erased while the latest divided map data pieces are left as it is, and therefore, increase in a data amount to be stored in the map storage database 36 is suppressed.

Additionally, mining work is performed in a mine, and a position or shape of a loading place LPA, a position or shape of a discharging place DPA, and a position or shape of a hauling path HL are changed day by day. Therefore, there is a high possibility that an old divided map data piece is deviated from a current state of a divided area. According to the second embodiment, since erasing is executed in order from the oldest divided map data piece, a divided map data piece to be stored in the map storage database 36 is prevented from being deviated from the state of the current divided area.

Additionally, according to the second embodiment, the file 4 not existing in the new folder but existing in the old folder is kept as it is as described with reference to FIG. 18. Consequently, it is possible to efficiently utilize data of the file 4 that cannot be acquired during the second period. According to the second embodiment, in a case of performing the scan matching navigation travel, divided map data pieces in an old folder and divided map data pieces in a new folder are integrated. In the example illustrated in FIG. 18, the scan matching navigation travel is performed by using data of the file 1, file 2, file 3, and file 4. Consequently, the scan matching navigation travel can be performed in a wide range of the mine.

Furthermore, according to the second embodiment, in a case where a divided map data piece (file) indicating a same divided area exists in each of both a new folder and an old folder, a logical sum of a file of the old folder and a file of the new folder is calculated. Consequently, reliability of the divided map data piece is improved, and the scan matching navigation travel can be performed with high accuracy.

Meanwhile, in the second embodiment, a file existing in an old folder but not existing in a new folder is kept as it is in the old folder. As for an elapsed time from generating, a second prescribed time (e.g., one month) longer than a prescribed time may be set, and a file of which an elapsed time from generating thereof exceeds the second prescribed time may be erased. Consequently, excessively old divided file data is prevented from continuously existing in the old folder.

Other Embodiments

Figure 20:
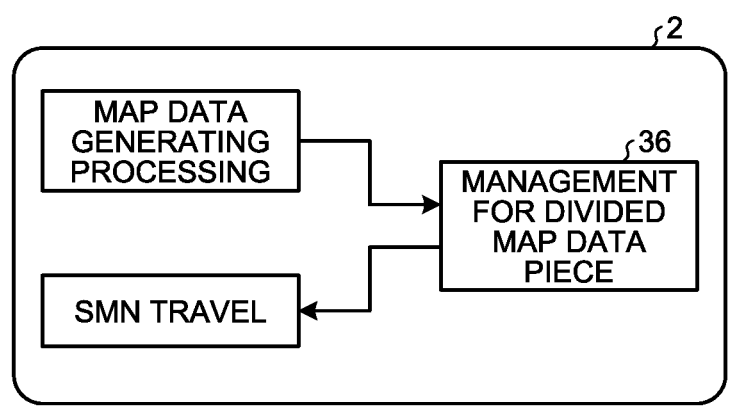
FIG. 20 is a schematic diagram illustrating a configuration of a dump truck 2.
Figure 21:
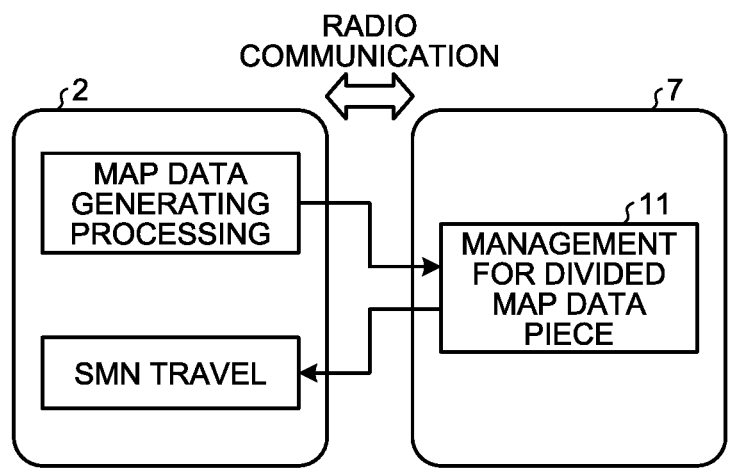
FIG. 21 is a schematic diagram illustrating a configuration of a management system.

Meanwhile, according to respective embodiments described above, a map storage database 36 is disposed in a dump truck 2 as illustrated in a schematic diagram of FIG. 20, and a divided map data piece generated in map data generating processing is managed in the map storage database 36 disposed in the dump truck 2 and used for scan matching navigation travel. As illustrated in a schematic diagram of FIG. 21, the map storage database 36 to store and manage a divided map data piece may also be provided in a computer 11 of a control facility 7 disposed at a position different from the dump truck 2. For example, an external storage device of a storage device 13 of the computer 11 may function as the map storage database 36. A divided map data piece generated in the map data generating processing performed by the dump truck 2 is wirelessly transmitted to the computer 11 of the management facility 7 via a communication system 9. In a case where the scan matching navigation travel is executed in the dump truck 2, specific map data MIf determined from among a plurality of divided map data pieces stored in the external storage device of the storage device 13 of the computer 11 is wirelessly supplied to a storage unit 33D of the dump truck 2 via the communication system 9.

Meanwhile, according to the above-described respective embodiments, detection data obtained by a laser sensor 24B of a non-contact sensor 24 is used during the scan matching navigation travel and in the map data generating processing. The detection data obtained by a radar 24A of the non-contact sensor 24 may also be used in at least one of the scan matching navigation travel and the map data generating processing. Note that the non-contact sensor 24 may be any ranging sensor as far as being capable of measuring a relative position with respect to an object around the dump truck 2. For example, as the non-contact sensor 24, a camera that acquires an optical image of an object around the dump truck 2 may also be used.

The constituent elements of the respective embodiments described above may include those readily conceivable by a person skilled in the art, those substantially identical, and those included in a so-called equivalent scope. Additionally, the constituent elements of the respective embodiments described above can be suitably combined. Additionally, some of the constituent elements may not be used.

Meanwhile, in the above-described embodiments, an example in which a work machine is a mining machine used in a mine has been described, but not limited thereto, the present invention may also be applicable to a work machine used in an underground mine or a work machine used in a work site on the ground. The work machine includes a mining machine.

Additionally, in the above embodiment, a position of a mining machine is detected by using a GPS detector, but not limited thereto, a position of a mining machine can also be detected on the basis of a known "position detecting device". Particularly, since a GPS cannot be detected in an underground mine, self-position estimation or the like may be used for a work machine using known position detecting devices such as an indoor messaging system (IMES), a pseudo satellite (pseudolite), a radio frequency identifier (RFID), a beacon, a surveying instrument, a radio LAN, an ultra wide band (UWB), a simultaneous localization and mapping (SLAM), and a landmark (mark provided beside a travel route). These position detecting devices may also be used for a mining machine in a mine on the ground or a work machine used in a work site on the ground.

While the example in which corrected observation information using a GPS base station 19 is utilized to detect a GPS position has been described in the embodiments, a position may also be detected singularly by a GPS receiver 31 of a dump truck 2. Additionally, in the above-described embodiments, whether an error (accuracy) of a GPS position is a predetermined error or less may also be determined on the basis of only the GPS receiver 31 of the dump truck 2 without using the corrected observation information of the GPS base station 19.

Furthermore, as an exemplary "control system for a work machine", a control system for a dump truck in a mine on the ground has been described in the above embodiments, but not limited thereto, the present invention also includes a control system for a different mining machine in a mine on the ground, a work machine in an underground mine, or a work machine used in a work site on the ground (such as an excavator, a bulldozer, and a wheel loader) and including a "position detecting device", a "non-contact sensor", and a "position calculating unit".

REFERENCE SIGNS LIST

1 Management System
2 Dump Truck (Mining Machine)
2E Internal Combustion Engine
2G Generator
2S Steering Device
3 Different Mining Machine
4 Mining Machine
5 Positioning Satellite
6 Repeater
7 Control Facility
9 Communication System
10 Management Device
11 Computer
12 Processing Device (Course Data Generating Unit)
13 Storage Device
13B Database
15 Input/Output Unit
16 Display Device
17 Input Device
18 Radio Communication Device
18A Antenna
19 GPS Base Station
19A Antenna
19B Transmitter/Receiver
19C Antenna
20 Travel Controller (Travel Control Unit)
21 Vehicle Body
22 Vessel
23 Wheel
23B Braking Device
23F Front Wheel
23M Electric Motor
23R Rear Wheel
24 Non-Contact Sensor
24A Radar
24B Laser Sensor
26 Gyro Sensor
27 Speed Sensor
30 Control System
31 GPS Receiver (Position Detecting Device)
31A Antenna
31B Antenna
32 Travel Route Generating Device
32A Route Position Storage Unit
33 Position Measurement Controller
33A Determination Unit
33B Scan Matching Navigation Calculating Unit (Position Calculating Unit)
33C Map Data Generating Unit
33D Storage Unit (Second Storage Unit)
33E Update Unit
33F Positional Data Acquisition Unit
34 Radio Communication Device
34A Antenna
35 First Signal Line
36 Map Storage Database
37A Second Communication Line
38 Observation Point Coordinate Conversion Unit
39 Observation Point Availability Determination Unit
40 Safety Controller
BK Bank
CR Crusher
DPA Discharging Place
GR Grid
HL Hauling Path
IAH Radiation Area
IAV Radiation Area
IS Intersection
KF Kalman Filter
LPA Loading Place
MI Map Data
MIf Specific Map Data
MIm Management Map Data
MIp Divided Map Data Piece
RP Travel Route

The invention claimed is:

1. A control system for a work machine, comprising:
   a position detecting device configured to detect a position of a work machine that travels on a travel route;
   a non-contact sensor configured to detect, in a non-contact manner, an object beside the travel route on which the work machine travels;
   a map data generating unit configured to generate management map data indicating a map of a management area in a mine on the basis of detection data obtained by the position detecting device and detection data obtained by the non-contact sensor;
   a first storage unit configured to store divided map data pieces each indicating a map of a divided area set by dividing the management area;
   a second storage unit different from the first storage unit;
   an update unit configured to determine, on the basis of detection data obtained by the position detecting device, specific map data from among a plurality of divided map data pieces stored in the first storage unit, and cause the second storage unit to read the specific map data; and
   a position calculating unit configured to calculate a position of the work machine by matching the specific map data read into the second storage unit with detection data obtained by the non-contact sensor.

2. The control system for a work machine according to claim 1, wherein
   the specific map data read into the second storage unit includes a first divided map data piece indicating a first divided area and a second divided map data piece indicating a second divided area adjacent to the first divided area, and
   the update unit updates the specific map data when it is determined that the work machine is moved from the first divided area to the second divided area on the basis of detection data obtained by the position detecting device.

3. The control system for a work machine according to claim 2, wherein
   the divided map data pieces stored in the first storage unit includes a third divided map data piece indicating a third divided area located adjacent to the second divided area in an advancing direction of the work machine, and
   when it is determined that the work machine is moved from the first divided area to the second divided area, the update unit causes the second storage unit to read the third divided map data piece stored in the first storage unit.

4. The control system for a work machine according to claim 3, wherein when it is determined that the work machine is moved from the first divided area to the second divided area, the update unit erases, from the second storage unit, a fourth divided map data piece stored in the second storage unit and indicating a fourth divided area located adjacent to the first divided area in an opposite direction of the advancing direction of the work machine.

5. The control system for a work machine according to claim 1, wherein the specific map data includes a divided map data piece indicating a divided area where the work machine exists, and a divided map data piece indicating each of a plurality of divided areas located around the divided area where the work machine exists.

6. The control system for a work machine according to claim 5, wherein the update unit performs, along with change of a position of the work machine: processing to cause the second storage unit to read at least part of the divided map data pieces stored in the first storage unit; and processing to erase at least part of the divided map data pieces stored in the second storage unit, such that a data amount of the specific map data to be stored in the second storage unit is kept at a constant value.

7. The control system for a work machine according to claim 6, wherein
   the management area includes the plurality of divided maps, in which the divided maps corresponding to first number of divisions are arranged in a first direction within a predetermined plane and the divided maps corresponding to second number of divisions are arranged in a second direction orthogonal to the first direction within the predetermined plane, and
   the update unit determines the specific map data to be read into the second storage unit on the basis of: a coordinate value of the divided area where the work machine exists within the predetermined plane; and at least one of the first number of divisions and the second number of divisions.

8. The control system for a work machine according to claim 1, wherein
   the divided map data pieces generated on the basis of detection data obtained by the position detecting device and detection data obtained by the non-contact sensor during a first period are stored in the first storage unit, and
   at least part of the divided map data pieces stored in the first storage unit are updated with the divided map data pieces generated during a second period after the first period on the basis of detection data obtained by the position detecting device and detection data obtained by the non-contact sensor.

9. The control system for a work machine according to claim 8, wherein
   the update unit calculates a logical sum of: a divided map data piece generated for a predetermined divided area during the first period; and a divided map data piece generated for the predetermined divided area during the second period, and
   the position calculating unit calculates a position of the work machine in the predetermined divided area by matching the logical sum with detection data obtained by the non-contact sensor.

10. A work machine comprising the control system for a work machine according to claim 1.

11. A management system for a work machine, comprising, in the work machine according to claim 10, a management device configured to output course data to define the travel route.

12. A management method for a work machine, comprising:
    generating management map data indicating a map of a management area in a mine on the basis of detection data obtained by a position detecting device that detects a position of a work machine traveling on a travel route and detection data obtained by a non-contact sensor that detects, in a non-contact manner, an object beside the travel route on which the work machine travels;
    setting a plurality of divided areas by dividing the management area and storing, in a first storage unit, a plurality of divided map data pieces each indicating a map of each of the divided areas;
    acquiring positional data of the work machine;
    causing a second storage unit different from the first storage unit to read specific map data determined from among the plurality of divided map data pieces stored in the first storage unit on the basis of the positional data of the work machine; and calculating a position of the work machine by matching the specific map data read into the second storage unit with detection data obtained by the non-contact sensor.

\* \* \* \* \*